US010926795B2

(12) United States Patent
Iwamura

(10) Patent No.: US 10,926,795 B2
(45) Date of Patent: Feb. 23, 2021

(54) WORK VEHICLE

(71) Applicant: Yanmar Power Technology Co., Ltd., Osaka (JP)

(72) Inventor: Keisuke Iwamura, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 186 days.

(21) Appl. No.: 16/076,653

(22) PCT Filed: Feb. 3, 2017

(86) PCT No.: PCT/JP2017/003897
§ 371 (c)(1),
(2) Date: Aug. 8, 2018

(87) PCT Pub. No.: WO2017/138444
PCT Pub. Date: Aug. 17, 2017

(65) Prior Publication Data
US 2019/0047620 A1 Feb. 14, 2019

(30) Foreign Application Priority Data
Feb. 9, 2016 (JP) .............................. JP2016-022543

(51) Int. Cl.
*B62D 11/06* (2006.01)
*E02F 3/84* (2006.01)
(Continued)

(52) U.S. Cl.
CPC ............ *B62D 11/06* (2013.01); *B62D 11/003* (2013.01); *B62D 11/183* (2013.01); *E02F 3/841* (2013.01);
(Continued)

(58) Field of Classification Search
CPC ...... B62D 11/06; B62D 11/003; B62D 11/183
See application file for complete search history.

(56) References Cited

U.S. PATENT DOCUMENTS

| 2003/0201134 A1* | 10/2003 | Ishii ..................... B60K 17/105 180/307 |
| 2004/0231907 A1* | 11/2004 | Ishii ..................... B60K 17/105 180/307 |
| 2006/0048977 A1* | 3/2006 | Akashima .............. B62D 55/06 180/6.6 |

FOREIGN PATENT DOCUMENTS

| JP | 2000-025642 A | 1/2000 |
| JP | 2001-163241 A | 6/2001 |

(Continued)

OTHER PUBLICATIONS

International Search Report dated Mar. 7, 2017 issued in corresponding PCT Application PCT/JP2017/003897.

*Primary Examiner* — Tony H Winner
(74) *Attorney, Agent, or Firm* — Norton Rose Fulbright US LLP

(57) ABSTRACT

A work vehicle including: an engine mounted on a traveling body; a straight-traveling system transmission path including a first stepless transmission device; and a turning system transmission path including a second stepless transmission device. The work vehicle combines an output of the straight-traveling system transmission path and an output of the turning system transmission path to drive left and right traveling units. The work vehicle further includes: control sections that control the output of the straight-traveling system transmission path and the output of the turning system transmission path in cooperation with each other; and a driving force blocking mechanism that blocks a driving force transfer from the straight-traveling system transmission path. When the driving force transfer from the straight-traveling system transmission path is blocked by the driving force blocking mechanism, the mutually reverse rotation operations of the left and right traveling units is inhibited.

5 Claims, 24 Drawing Sheets

(51) Int. Cl.
  *E02F 9/20* (2006.01)
  *B62D 11/00* (2006.01)
  *B62D 11/18* (2006.01)
  *B62D 55/00* (2006.01)
  *E02F 3/76* (2006.01)
  *E02F 9/02* (2006.01)
  *E02F 9/16* (2006.01)

(52) U.S. Cl.
  CPC ............ *E02F 9/2025* (2013.01); *B62D 55/00* (2013.01); *E02F 3/7609* (2013.01); *E02F 9/02* (2013.01); *E02F 9/16* (2013.01)

(56) References Cited

FOREIGN PATENT DOCUMENTS

| | | |
|---|---|---|
| JP | 2002-059753 A | 2/2002 |
| JP | 2005-067606 A | 3/2005 |
| JP | 2005-083497 A | 3/2005 |
| JP | 2014-144008 A | 8/2014 |

\* cited by examiner

WORK VEHICLE

CROSS REFERENCES TO RELATED APPLICATIONS

This application is a national stage application pursuant to 35 U.S.C. § 371 of International Application No. PCT/JP2017/003897, filed on Feb. 3, 2017, which claims priority under 35 U.S.C. § 119 to Japanese Patent Application No. 2016-022543, filed on Feb. 9, 2016, the disclosures of which are hereby incorporated by reference in their entireties.

TECHNICAL FIELD

The present invention relates to work vehicles such as agricultural machines typified by tractors and combine harvesters and specialized work machines typified by crane trucks and backhoes.

BACKGROUND ART

Some conventional work vehicles such as agricultural vehicles typified by tractors and combine harvesters and construction machines typified by crawler cranes include a work vehicle including two hydraulic stepless transmissions (HSTs) to which a driving force is transmitted from an engine, and each of the two HSTs outputs a straight-traveling force and a turning force based on an engine output. The inventor of this application previously proposed, in Patent Literature 1 (PTL 1), a work vehicle in which a straight-traveling force and a turning force output from each of the two HSTs are combined by left and right planetary gear mechanisms so that the work vehicle can turn.

Some conventional work vehicles include a work vehicle in which a hydromechanical transmission (HMT) having a transmission efficiency higher than that of an HST is housed in a transmission case to which a driving force is transmitted from an engine. The inventor previously proposed, in Patent Literature 2 (PTL 2), an in-line hydromechanical transmission in which a hydraulic pump and a hydraulic motor are disposed in line in such a manner that an input shaft of the hydraulic pump and an output shaft of the hydraulic motor are disposed concentrically.

In the in-line hydromechanical transmission, the output shaft is relatively rotatably fitted onto the input shaft to which a driving force is transmitted from the engine. A hydraulic pump, a cylinder block, and a hydraulic motor are also fitted onto the input shaft. The cylinder block alone is used for both the hydraulic pump and the hydraulic motor, and a driving force is transmitted from the hydraulic motor to the output shaft. Thus, unlike a typical hydromechanical transmission, the in-line hydromechanical transmission can combine a shifted driving force by hydraulic pressure and a driving force of the engine without interposition of planetary gear mechanisms so that high power transmission efficiency can be obtained advantageously.

CITATION LIST

Patent Literatures

PTL 1: Japanese Patent Application Laid-Open No. 2002-059753
PTL 2: Japanese Patent Application Laid-Open No. 2005-083497

SUMMARY OF INVENTION

Technical Problem

To mount the hydromechanical transmission of PTL 2 on a middle- or large-sized work vehicle, an output of the hydromechanical transmission needs to be increased. To increase the output of the hydromechanical transmission, the capacity of the hydromechanical transmission is increased, for example. However, simply increasing the capacity of the hydromechanical transmission has problems of not only an increase in manufacturing costs due to an increase in the size of the hydromechanical transmission itself but also sacrifice of a power transmission efficiency (especially an efficiency in a low load range).

In the case of mounting the mechanism in PTL 1 on a large-sized work vehicle, the size of the mechanism also increases with an increase in the output of the hydraulic stepless transmission. Thus, not only the weight of the work vehicle increases but also a power transmission efficiency is lower than that of a hydromechanical transmission, and therefore, a transmission range in a straight-traveling direction (main transmission range) is restricted. In addition, when the work vehicle performs a pivot turning, the left and right traveling units are subjected to frictional force in opposite directions from the ground. Thus, operations unexpected by an operator, such as a long-term pivot turn, might occur.

In addition, a controller for controlling a traveling operation needs to combine signals from operation tools for main transmission, forward and reverse, and turning to control swash plate angles of two hydraulic stepless transmissions, and thus, has to execute a complicated control flow. For these reasons, the controller is subjected to a heavy computation load in the control flow of a traveling operation, and thus, an operator might feel a strangeness in operability.

Solution to Problem

It is therefore a technical object of some aspects of the present invention to provide a work vehicle improved in view of the foregoing circumstances.

A work vehicle according to an aspect of the present invention includes: an engine that is mounted on a traveling body; a straight-traveling system transmission path including a first stepless transmission device; a turning system transmission path including a second stepless transmission device, the work vehicle being configured to combine an output of the straight-traveling system transmission path and an output of the turning system transmission path to drive left and right traveling units; a control section that controls the output of the straight-traveling system transmission path and the output of the turning system transmission path in cooperation with each other; and a driving force blocking mechanism that blocks driving force transfer from the straight-traveling system transmission path, wherein in a case where driving force transfer from the straight-traveling system transmission path is blocked by the driving force blocking mechanism, the control section restricts the output of the turning system transmission path to inhibit mutually reverse rotation operations of the left and right traveling units.

The work vehicle may include a transmission operation tool that specifies the output of the straight-traveling system transmission path; and a detector that detects the output of the straight-traveling system transmission path, wherein the control section may select one of an instruction value from the transmission operation tool and an actually measured value from the detector and sets the output of the turning system transmission path, and in the case where driving force transfer from the straight-traveling system transmission path is blocked by the driving force blocking mechanism, the control section may set the output of the turning system transmission path based on the actually measured value from the detector.

In the work vehicle, in the case where driving force transfer from the straight-traveling system transmission path is blocked by the driving force blocking mechanism, when the control section recognizes that a traveling direction of one of the traveling units is opposite to a traveling direction of the traveling body, the control section may restrict a coefficient to multiply the actually measured value from the detector to thereby restrict the output of the turning system transmission path.

The work vehicle may include a steering wheel that is rotatable by an operation, wherein in the case where driving force transfer from the straight-traveling system transmission path is blocked by the driving force blocking mechanism, when a steering angle of the steering wheel exceeds a predetermined angle, the control section may restrict a coefficient to multiply the actually measured value from the detector to thereby restrict the output from the turning system transmission path.

In the work vehicle, the control section may include a first control section that controls the output of the straight-traveling system transmission path and a second control section that controls the output of the turning system transmission path, and the second control section may receive the output of the straight-traveling system transmission path set in the first control unit to thereby set the output of the turning system transmission path.

Advantageous Effects of Invention

In some aspects of the present invention, in a case where driving force transfer from the straight-traveling system transmission path is blocked by the driving force blocking mechanism, to inhibit mutually reverse rotation operations of the left and right traveling units, a differential output from the turning system transmission path. Thus, even in a case where no braking action is exerted on an output side of the straight-traveling system transmission path, the turning system transmission path can be constantly set to be optimum for the traveling state of the traveling body. Accordingly, in the case where no braking action is exerted on the output side of the straight-traveling system transmission path, consecutive pivot turns of the traveling body can be prevented, and a braking action due to a reaction force such as a frictional force from the ground is exerted on the traveling units. As a result, safety traveling can be achieved.

According to some aspects of the present invention, with the configuration in which one of the instruction value from the transmission operation tool and the actually measured value from the detector is selected so that the output of the turning system transmission path is set, the output of the turning system transmission path can be constantly set to be optimum for the traveling state of the traveling body. Thus, an operator can stably control the vehicle in turning the traveling body with enhanced operability, and can perform a stable driving operation.

In some aspects of the present invention, since the output of the turning system transmission path is set based on the actually measured value while the driving force blocking mechanism is disconnected, even in a case where the instruction value and the actually measured value based on the transmission operation tool are significantly different from each other, the vehicle can turn using a turning center and a turning radius in accordance with the traveling state of the current traveling body. As a result, the operator can operate the traveling body without incongruity, and contributes to smooth controllability for the operator. Thus, the operator can stably control the vehicle in turning the traveling body with enhanced operability, and can perform a stable driving operation.

In some aspects of the present invention, the speed ratio between the left and right traveling units is determined based on the steering wheel angle of the steering wheel. Thus, the traveling body can be turned in accordance with the amount of operation of the steering wheel, which can contribute to enhancement of operability. In addition, since the output of the straight-traveling system transmission path and the output of the turning system transmission path are in cooperation with each other, the vehicle speed in turning is close to that of steering feeling of the operator, and in addition, a behavior of the traveling body can be stabilized.

In some aspects of the present invention, control can be distributed to the first and second control sections. Thus, the amount of calculation of each control section can be reduced so that highly responsive traveling control can be achieved. Since the second control section receives an output from the first control section to set the output of the turning system transmission path. Thus, calculation of the second control section is not complicated, and thus, travel control can be more smoothly performed.

DESCRIPTION OF EMBODIMENTS

Figure 1:
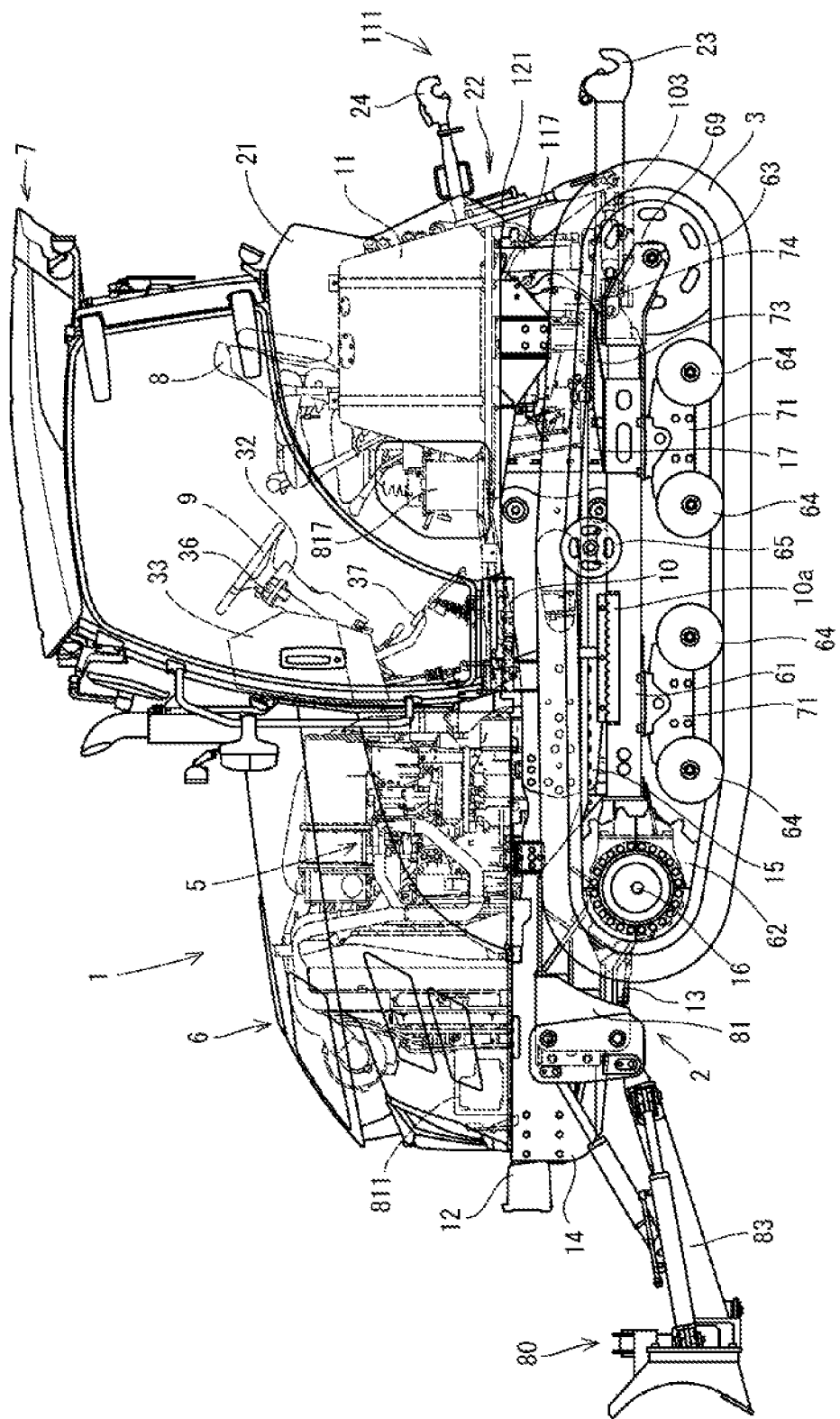
FIG. 1 A left side view of a tractor
FIG. 2 A right side view of the tractor
FIG. 3 A plan view of the tractor
FIG. 4 A right side view of a traveling body
FIG. 5 A left side view of a traveling body
FIG. 6 A plan view of the traveling body
FIG. 7 A plan illustration of a cockpit seat unit
FIG. 8 A perspective view illustrating a configuration of the periphery of a steering wheel
FIG. 9 A perspective view illustrating a coupling configuration of a brake mechanism and a brake pedal
FIG. 10 An illustration showing a relationship between the discharge rate of hydraulic oil of a hydromechanical transmission and a vehicle speed
FIG. 11 A skeleton diagram of a power transmission system of the tractor
FIG. 12 A hydraulic circuit diagram of the tractor
FIG. 13 A block diagram illustrating a configuration of a control system of the tractor
FIG. 14 A block diagram illustrating a configuration of a traveling control system of the tractor
FIG. 15 Graphs showing relationships between parameters stored in a deceleration table and a turning/straight-traveling ratio table
FIG. 16 A flowchart of a travel control operation of the tractor
FIG. 17 A graph showing a relationship between the steering angle of the steering wheel and the vehicle speed of the tractor
FIG. 18 A graph showing a relationship between the steering angle of the steering wheel and the vehicle speed of the tractor in a brake turn mode FIG. 19 A graph showing a relationship between the steering angle of the steering wheel and the vehicle speed of the tractor in a gentle turn mode FIG. 20 A flowchart depicting a setting operation of a turning target value FIG. 21 A flowchart depicting an operation of steering sensitivity setting control FIG. 22 A graph showing a relationship between a deceleration and a turning/straight-traveling ratio set based on steering sensitivity setting control FIG. 23 A flowchart depicting another example (second example) of a setting operation of a turning target value FIG. 24 A flowchart depicting another example (third example) of a setting operation of a turning target value
Figure 2:
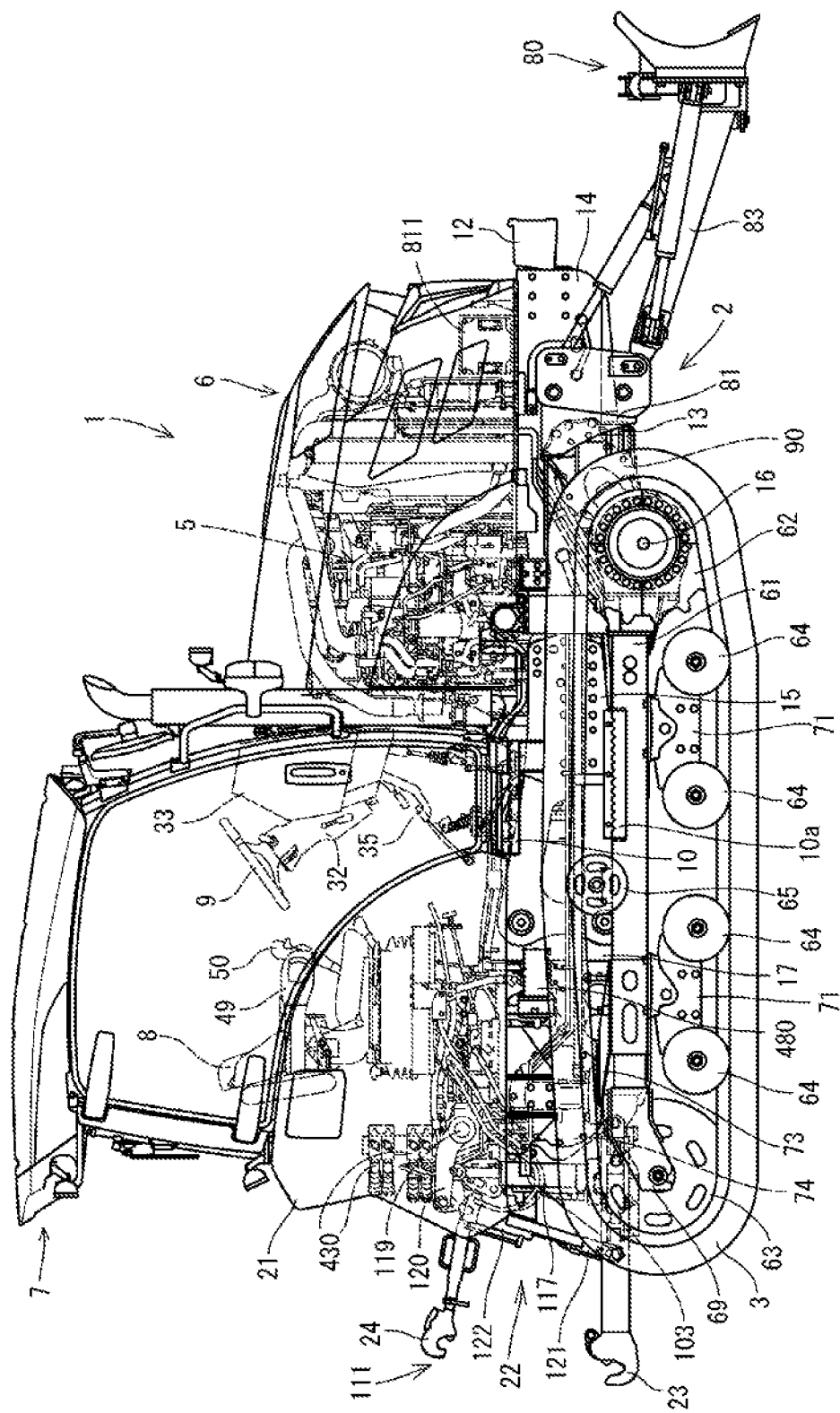
Figure 3:
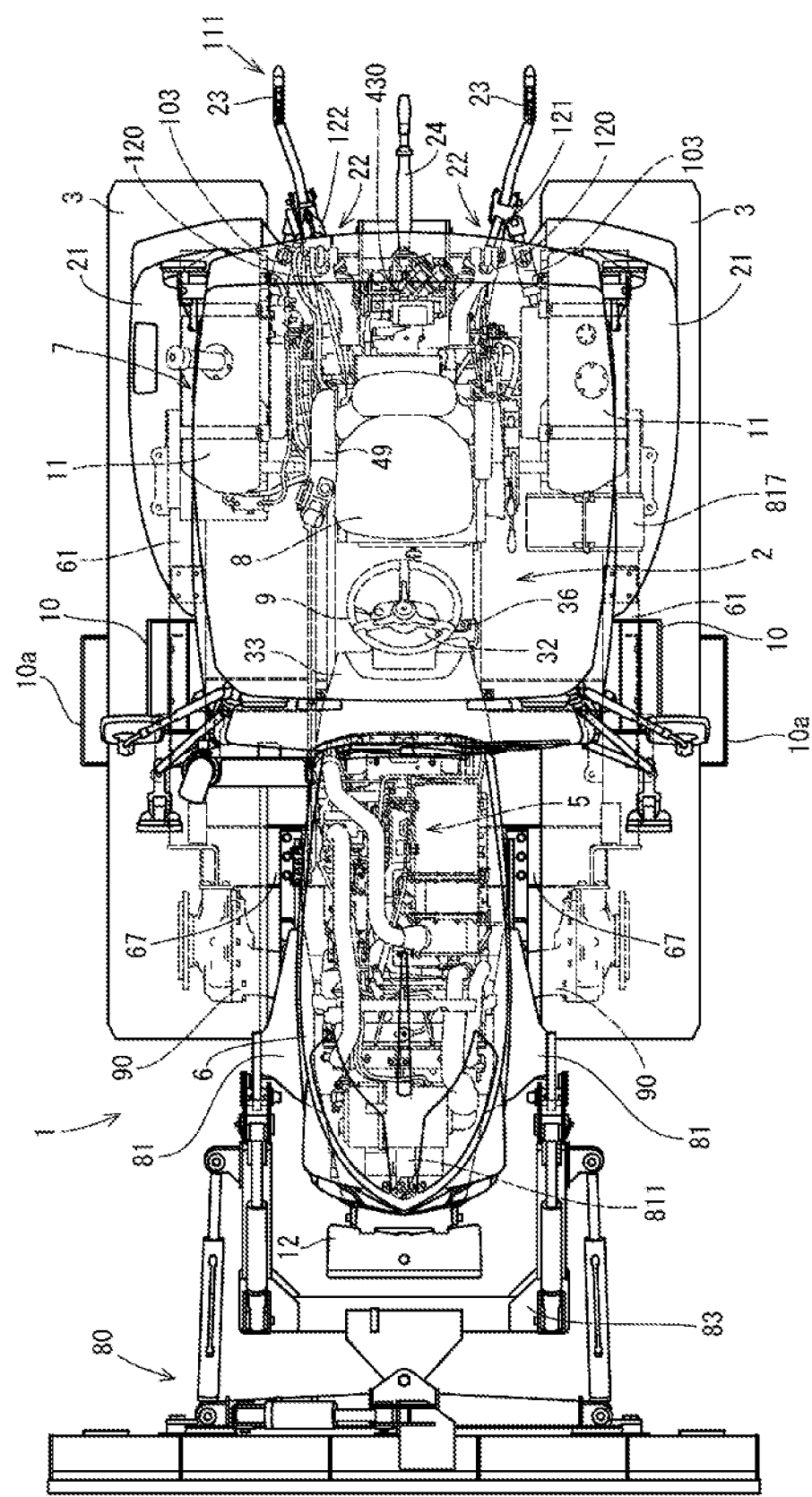

Regarding an embodiment of the present invention, an agricultural tractor will be described hereinafter with reference to the drawings. As illustrated in FIGS. 1 through 6, a traveling body 2 of a tractor 1 is supported by a pair of left and right traveling crawlers 3 serving as a traveling unit. A diesel engine 5 (hereinafter simply referred to as an engine) is mounted in a front portion of the traveling body 2. The diesel engine 5 drives the traveling crawlers 3 to thereby cause the tractor 1 to travel forward and rearward. The engine 5 is covered with a hood 6. A cabin 7 is disposed on the upper surface of the traveling body 2. In the cabin 7, a cockpit seat 8 and a steering wheel 9 for steering and operating the traveling crawlers 3 are disposed. Steps 10 with which the operator steps up and down are externally disposed at the left and right sides of the cabin 7. Fuel tanks 11 for supplying fuel to the engine 5 are disposed below the left and right sides of the cabin 7, and are covered with left and right rear fenders 21. A battery 817 for supplying electric power to a portion ahead of the fuel tanks 11 is disposed at the left side of the cabin 7, and the battery 817 and the fuel tank 11 are covered with the left rear fender 21.

The traveling body 2 is constituted by an engine frame 14 including a front bumper 12 and a turning transmission case (drive axle) 13, and left and right vehicle body frames 15 detachably fixed to a rear portion of the engine frame 14. A vehicle shaft 16 rotatably projects outward from the left and right ends of the turning transmission case 13. The vehicle shaft 16 is covered with axle cases 90 that are disposed at the left and right side surfaces of the turning transmission case 13. Drive sprockets 62 are attached to the left and right ends of the turning transmission case 13 through the vehicle shaft 16. Rear portions of the vehicle body frames 15 are coupled to a straight-traveling transmission case 17 for appropriately shifting the speed of a rotative force from the engine 5 and transmitting the power to the drive sprockets 62.

As illustrated in FIGS. 1 through 4, left and right truck frames 61 are disposed on the lower surface of the traveling body 2. The pair of left and right truck frames 61 extends longitudinally (front-rear direction) and is located at outer sides of the engine frame 14 and the vehicle body frames 15. The left and right truck frames 61 are coupled to the engine frame 14 and the vehicle body frames 15 by a lower frame 67 extending laterally (left-right direction). The front ends of the left and right truck frames 61 are coupled to the axle cases 90 disposed on the left and right side surfaces of the turning transmission case 13. Steps 10a with which an operator steps up and down are externally disposed at the left and right truck frames 61.

A lateral center of the lower frame 67 is fixed to a rear side surface of the engine frame 14 through a coupling bracket 72. Lateral ends of a laterally extending beam frame 68 are coupled to longitudinally intermediate portions of the left and right truck frames 61. The center of the beam frame 68 is coupled to the center of the lower frame 67 through a longitudinally extending reinforcing frame 70. Rear beams 73 projecting inward from rear portions of the left and right truck frames 61 are coupled to rear housings 74 fixed to left and right side surfaces of the straight-traveling transmission case 17 so that the rear portions of the truck frames 61 are fixed to the left and right side surfaces of the straight-traveling transmission case 17.

The truck frames 61 are provided with the drive sprockets 62 that transmit a driving force from the engine 5 to the traveling crawlers 3, tension rollers 63 that maintain tension of the traveling crawlers 3, a plurality of truck rollers 64 that hold the ground sides of the traveling crawlers 3 at ground, and intermediate rollers 65 that hold non-ground sides of the traveling crawlers 3. The drive sprockets 62 support the front sides of the traveling crawlers 3. The tension rollers 63 support the rear sides of the traveling crawlers 3. The truck rollers 64 support the ground sides of the traveling crawlers 3. The intermediate rollers 65 support the non-ground sides of the traveling crawlers 3. The tension rollers 63 are rotatably supported by the rear ends of tension frames 69 configured to extend and contract rearward of the rear ends of the truck frames 61. The truck rollers 64 are rotatably supported on the front and rear of equalizer frames 71 that are supported on lower portions of the truck frames 61 to freely swing longitudinally.

A front dozer 80 is configured to be attached to a front portion of the tractor 1. A pair of left and right dozer brackets 81 is fixed to a side surface of a front portion of the engine frame 14, the axle cases 90, and the lower frame 67. A support arm 83 of the front dozer 80 having a U shape in plan view is detachably and pivotally supported by the outer sides (vehicle outer sides) of the left and right dozer brackets 81. Inner sides (vehicle inner sides) of front ends of the left and right dozer brackets 81 are coupled to the side surfaces of the left and right engine frames 14, lower sides of the rear ends of the left and right dozer brackets 81 are coupled to the upper surface of an intermediate portion of the lower frame 67, and intermediate portions of the left and right dozer brackets 81 are coupled to and vertically sandwich intermediate portions of the axle cases 90. The dozer brackets 81 are firmly fixed to the three members of the engine frame 14, the axle cases 90, and the lower frame 67 and, thereby, can obtain strength enough to endure heavy work by the front dozer 80.

Hydraulic lifting and lowering mechanisms 22 that lift and lower a ground work machine (not shown) such as a rotary tiller are detachably attached to a rear portion of the straight-traveling transmission case 17. The ground work machine is coupled to the rear portion of the straight-traveling transmission case 17 through a three-point link mechanism 111 including a pair of left and right lower links 23 and a top link 24. A PTO shaft 25 projects rearward from a rear side surface of the straight-traveling transmission case 17 and is used for transmitting a PTO driving force to the work machine such as a rotary tiller.

Figure 4:
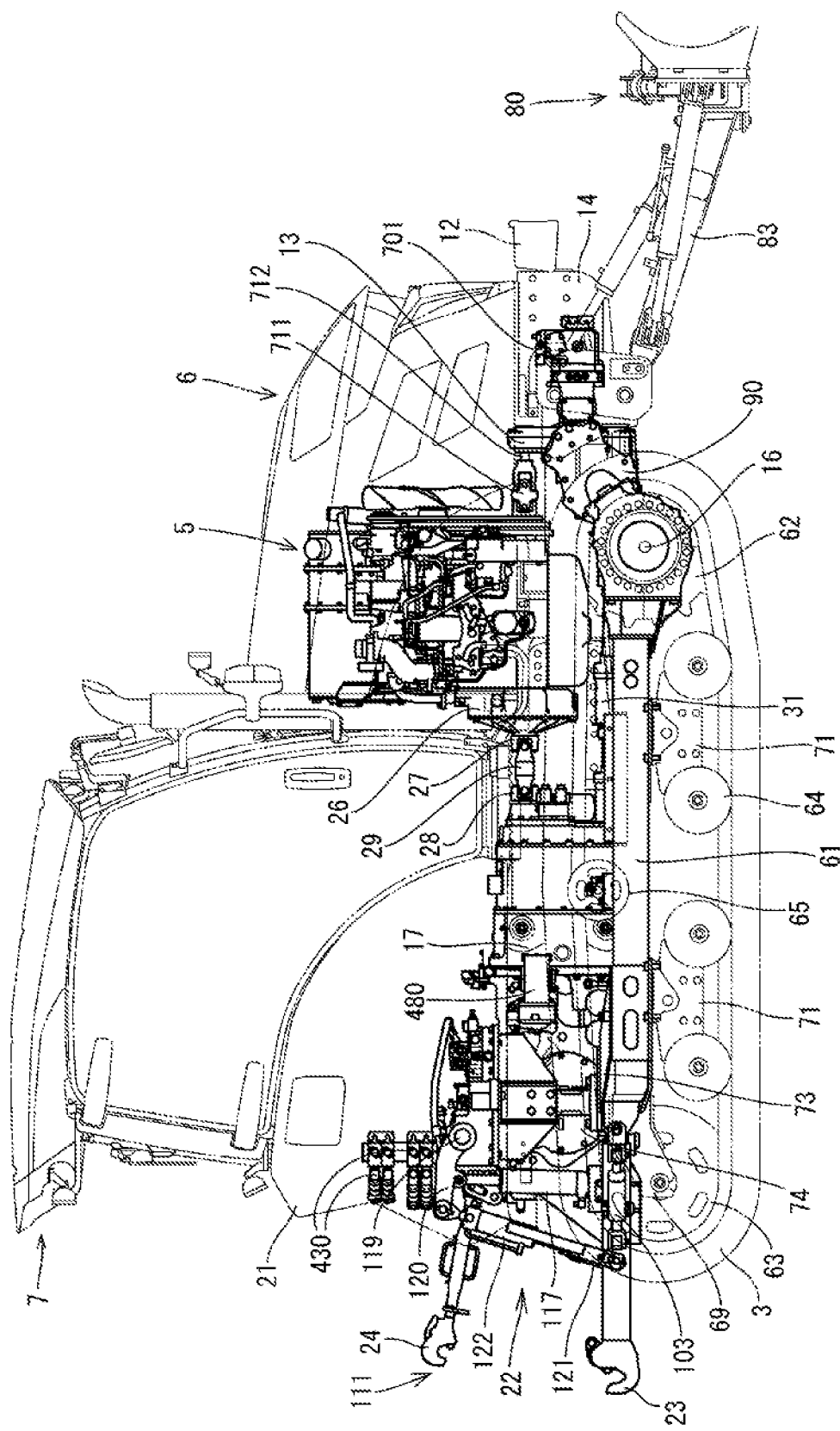
Figure 5:
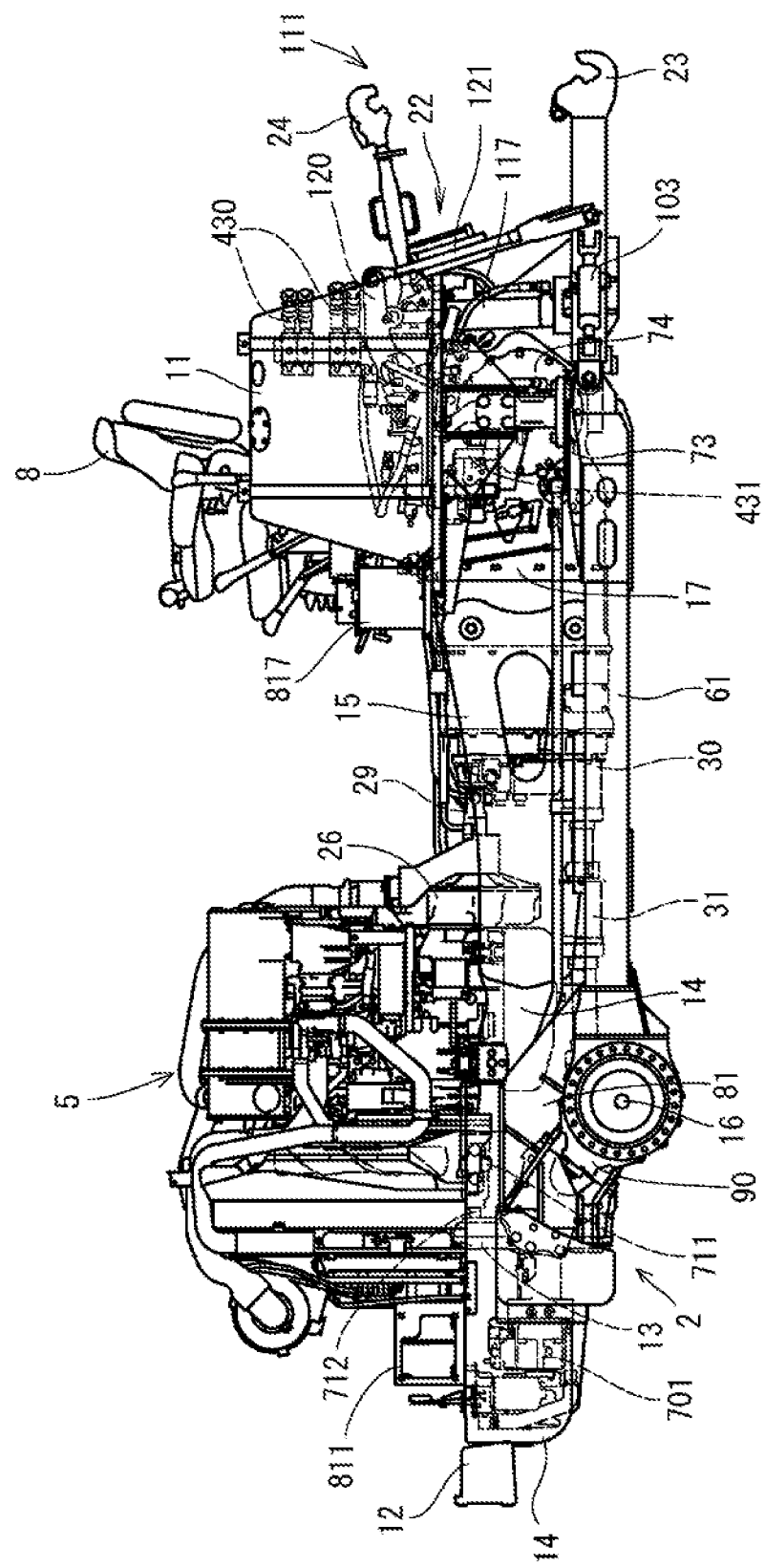
Figure 6:
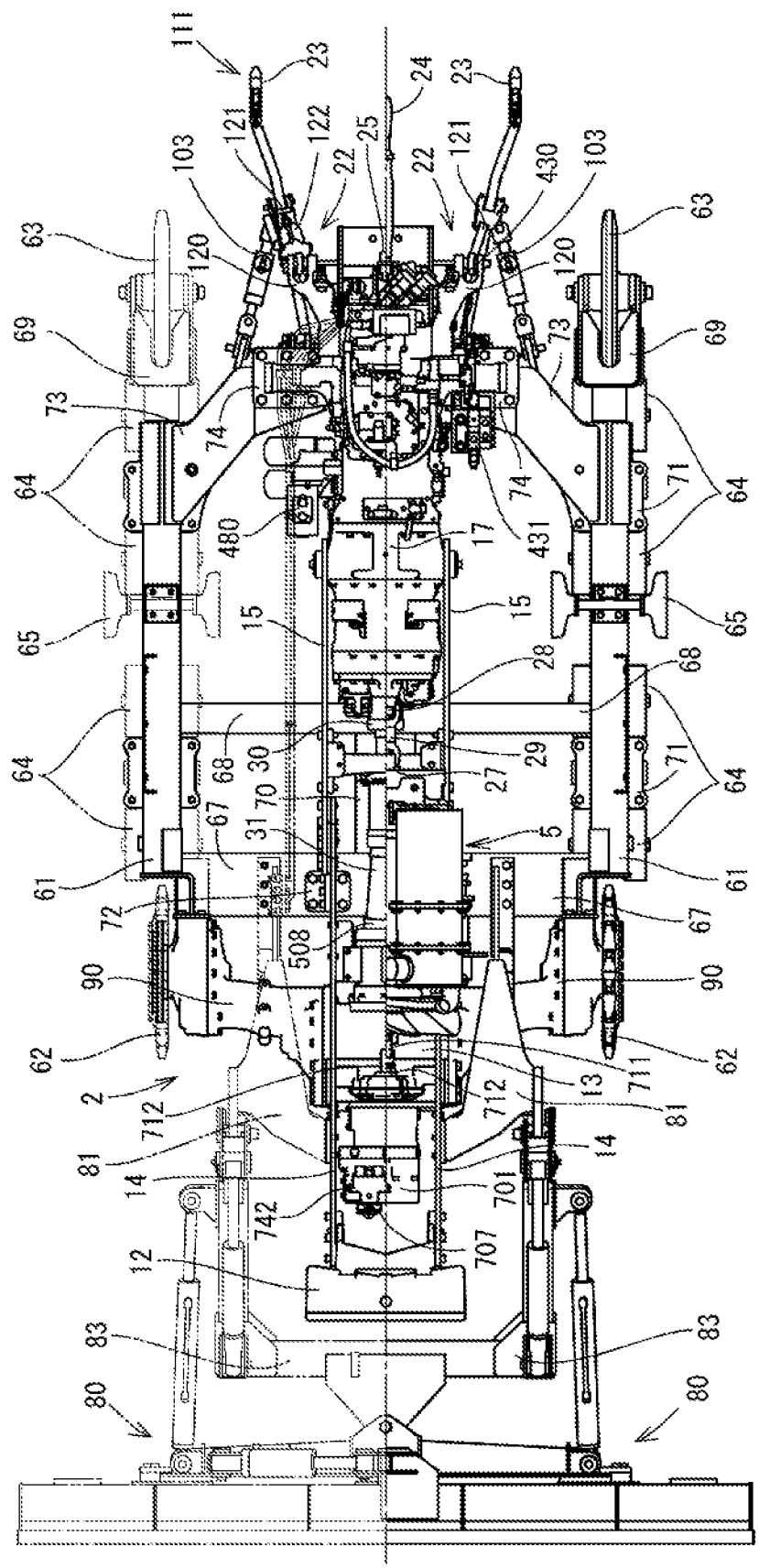

As illustrated in FIGS. 4 through 6, a flywheel 26 is attached to be directly coupled to the rear end of an output shaft (piston rod) 5a of the engine 5 that projects rearward from the rear side surface of the engine 5. A main driving shaft 27 projecting rearward from the flywheel 26 and an input counter shaft 28 projecting forward from the front surface of the straight-traveling transmission case 17 are coupled to each other through a driving force transmission shaft 29 including universal joints on both ends. A straight-traveling input counter shaft 508 projecting rearward from the turning transmission case 13 is coupled to a straight-traveling output shaft 30 projecting forward from a lower portion of the front surface of the straight-traveling transmission case 17 through a driving force transmission shaft 31 including universal joints on both ends. A turning input counter shaft 712 projecting rearward from the turning transmission case 13 is coupled to the front end of the output shaft (piston rod) 5a of the engine 5 projecting forward from the front side surface of the engine 5 through a driving force transmission shaft 711 including universal joints on both ends.

As illustrated in FIGS. 1 through 6, the hydraulic lifting and lowering mechanisms 22 include: left and right hydraulic lift cylinders 117 that are operated and controlled in accordance with an operation on a work unit position dial 51 or the like; left and rear lift arms 120 having base end sides pivotally supported by an upper surface lid of the straight-traveling transmission case 17 through a lift supporting shaft; and left and right lift rods 121 coupling the left and right lift arms 120 to the left and right lower links 23. The right lift rod 121 is partially formed of a horizontal cylinder 122 for hydraulic control, and thus, the length of the right lift rod 121 can be adjusted to be increased or reduced with the horizontal cylinder 122. In this configuration, in a case where the length of the right lift rod 121 is changed by extending or contracting the piston of the horizontal cylinder 122 with the ground work machine supported by the top link 24 and the left and right lower links 23, the left and right tilt angles of the ground work machine are changed.

Figure 7:
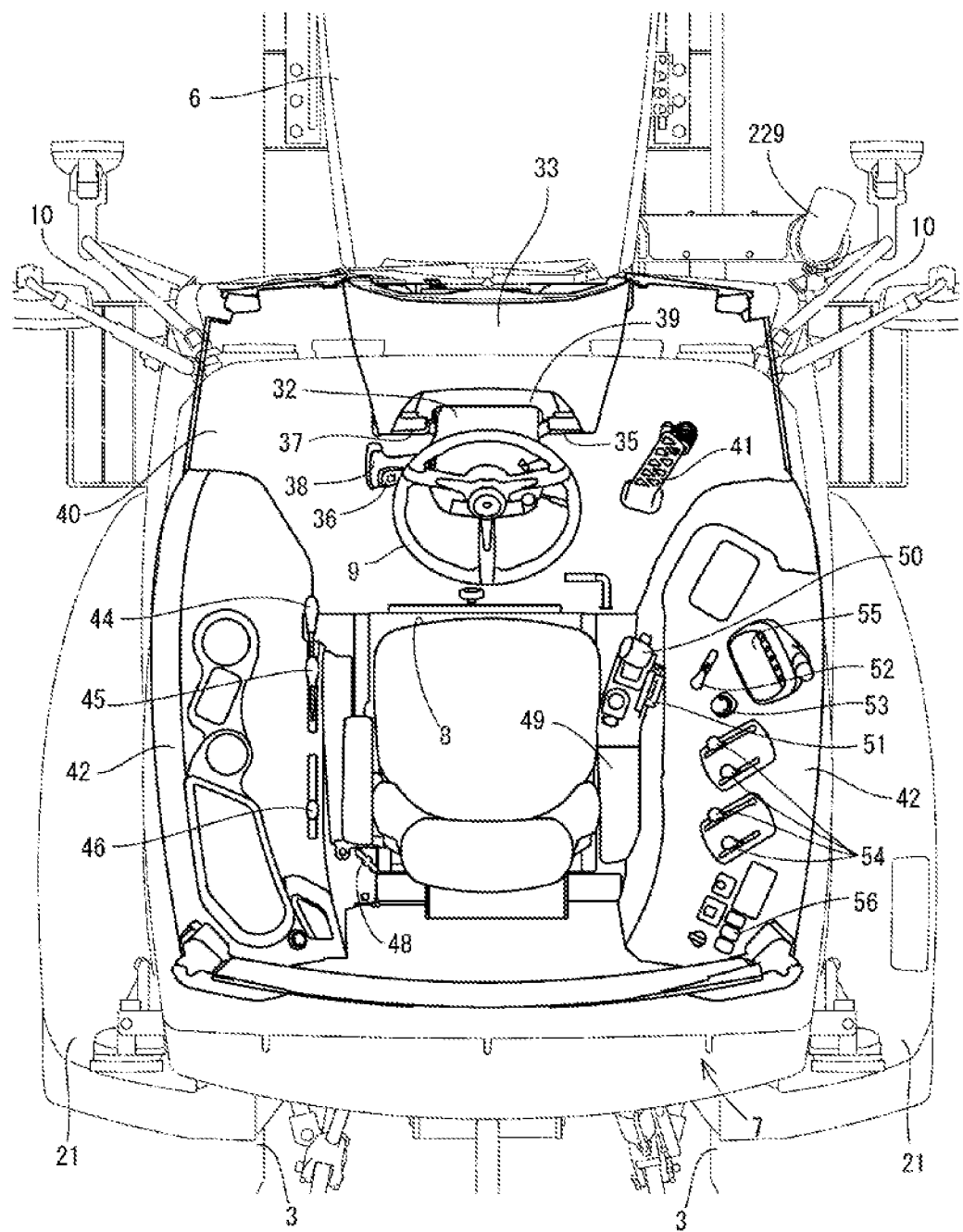

Next, with reference to FIGS. 7 through 9, for example, an internal configuration of the cabin 7 will be described. A steering column 32 is disposed forward of the cockpit seat 8 in the cabin 7. The steering column 32 stands while being buried on the rear surface of a dashboard 33 disposed on the front surface side in the cabin 7. The steering wheel 9 having a substantially circular shape in plan view is attached to the upper end of a steering shaft 921 projecting upward from the upper surface of the steering column 32. A steering angle (steering wheel angle) detection mechanism 880 including a steering angle sensor 821 for detecting a steering angle of the steering wheel 9 is coupled to the lower end of the steering shaft 921 in the steering column 32.

A brake pedal 35 for braking the traveling body 2 is disposed at the right of the steering column 32. A forward-reverse switching lever 36 (reverser lever) for switching the traveling direction of the traveling body 2 between forward and reverse and a clutch pedal 37 for disengaging hydraulic clutches 537, 539, and 541 for engaging/disengaging a driving force are disposed at the left of the steering column 32. A parking brake lever 43 for holding the brake pedal 35 at a pressed position is disposed at the rear of the steering column 32.

A misoperation preventing member 38 (reverser guard) extending along the forward-reverse switching lever 36 is disposed at the left of the steering column 32 below the forward-reverse switching lever 36. The misoperation preventing member 38 as a contact preventing member, which is disposed below the forward-reverse switching lever 36, can prevent an accidental contact of an operator with the forward-reverse switching lever 36 when the operator takes on or off the tractor 1. An operation display board 39 incorporating a liquid crystal panel is disposed on an upper portion of the rear surface of the dashboard 33.

An accelerator pedal 41 for controlling the rotation speed of the engine 5 or the vehicle speed, for example, is disposed at the right of the steering column 32 on the floor plate 40 forward of the cockpit seat 8 in the cabin 7. The substantially entire upper surface of the floor plate 40 is flat. Side columns 42 are disposed at the left and right sides of the cockpit seat 8. An ultra-low speed lever 44 (creep lever) for forcibly and largely reducing the traveling speed (vehicle speed) of the tractor 1, a sub-transmission lever 45 for switching an output range of a traveling sub-transmission gear mechanism in the straight-traveling transmission case 17, and a PTO transmission lever 46 for performing a switching operation on the driving speed of the PTO shaft 25 are disposed between the cockpit seat 8 and the left side column 42.

An arm rest 49 on which an arm or an elbow of the operator seated on the cockpit seat 8 is disposed between the cockpit seat 8 and the right side column 42. The arm rest 49 is provided separately from the cockpit seat 8, and includes a main transmission lever 50 for increasing and decreasing the traveling speed of the tractor 1 and a work unit position dial 51 (lifting and lowering dial) that is a dial with which the height position of the ground work machine such as a rotary tiller is manually adjusted. The arm rest 49 is configured to be pivotable about a lower portion of the rear end thereof to be raised in a plurality of stages. In the embodiment, when the main transmission lever 50 is tilted forward, the vehicle speed of the traveling body 2 increases. On the other hand, when the main transmission lever 50 is tilted rearward, the vehicle speed of the traveling body 2 decreases. The arm rest 49 further includes a main transmission sensor 822 (see FIG. 13) of a potentiometer (variable resistor) type that detects a forward or rearward tilt of the main transmission lever 50.

The right side column 42 is provided with, in order from the front, an operating monitor 55 having a touch panel function and enabling an instruction operation to each part of the tractor 1, a throttle lever 52 that holds setting of the rotation speed of the engine 5, a PTO clutch switch 53 that engages and disengages power transmission from the PTO shaft 25 to the work machine such as a rotary tiller, a plurality of hydraulic operation levers 54 (SCV levers) for switching a hydraulic pressure output valve 430 disposed on the upper surface of the straight-traveling transmission case 17, and a single-double acting shift switch 56 for a switching operation of a double-acting valve mechanism 431 disposed on the front surface of the rear housing 74. Here, the hydraulic pressure output valve 430 is used for controlling supply of hydraulic oil to hydraulic pressure equipment of another work machine, such as a front loader retrofitted to the tractor 1. The double-acting valve mechanism 431 operates together with a lifting and lowering valve mechanism 652 disposed on the upper surface of the straight-traveling transmission case 17 to be thereby used for actuating the hydraulic lift cylinders 117 in a double-acting manner.

Figure 8:
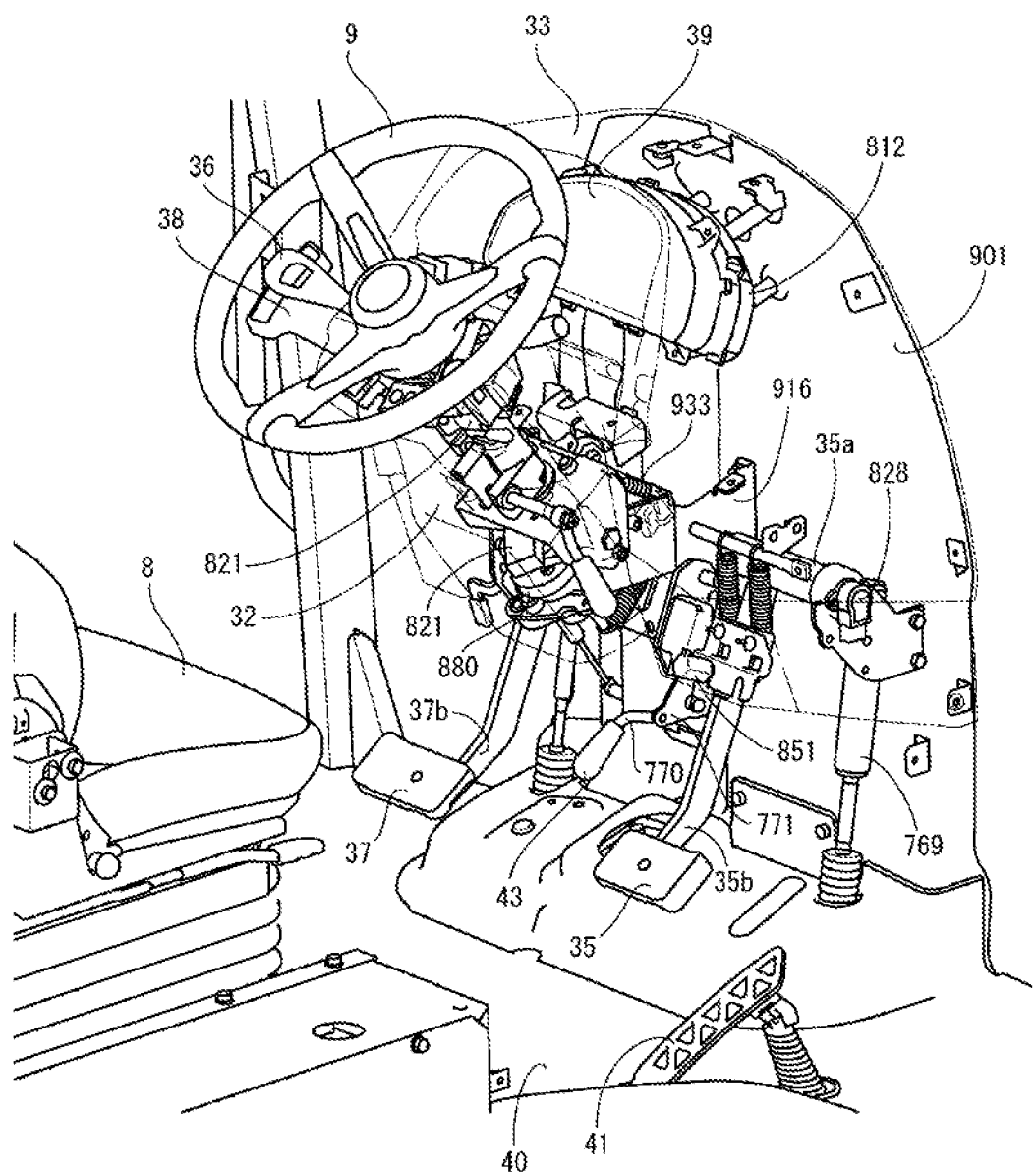
Figure 9:
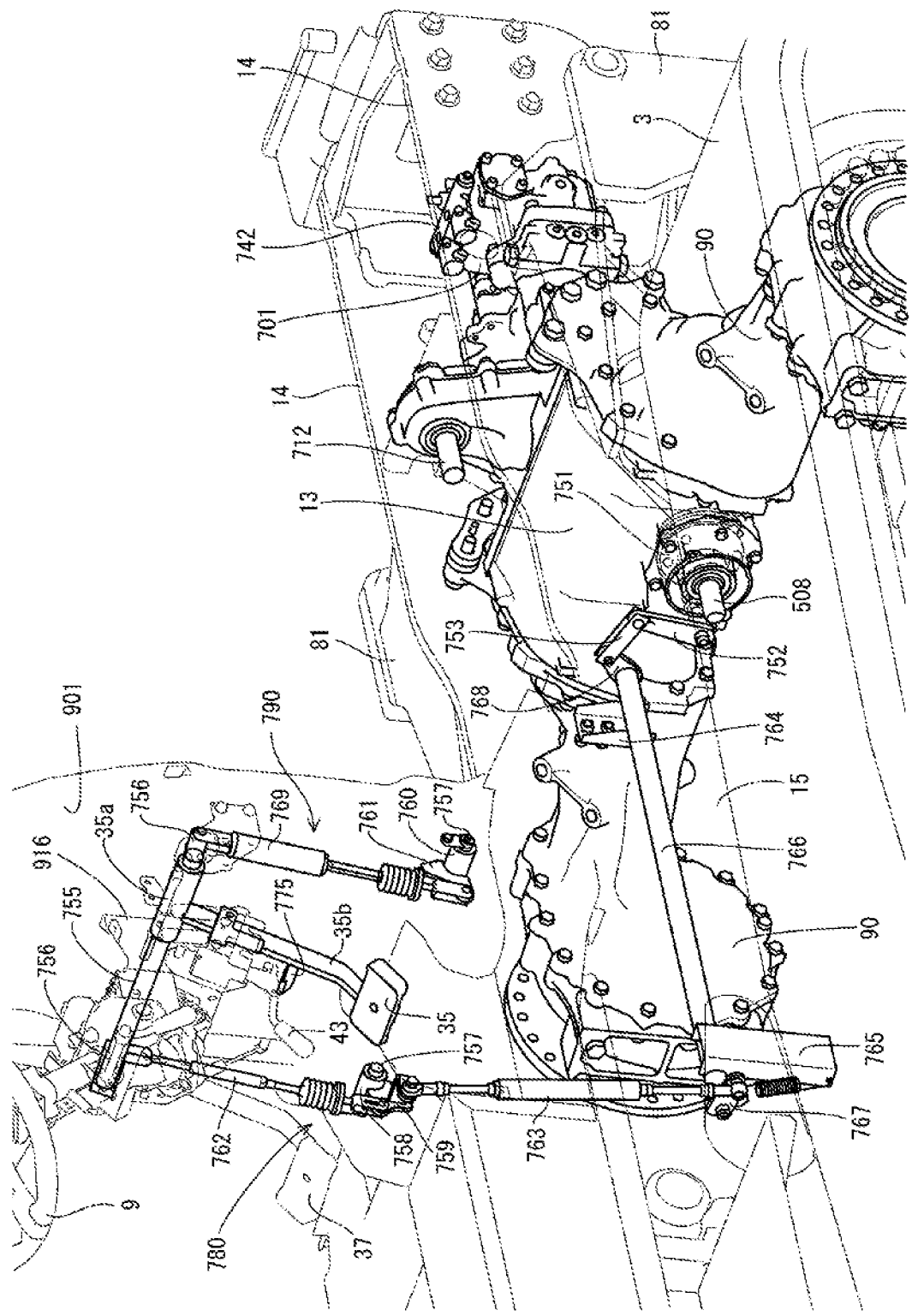

Referring mainly to FIGS. 8 and 9, a relationship between the brake pedal 35 and the brake mechanism 751 will now be described. Ahead of the steering column 32, a brake pedal supporting bracket 916 pivotally supporting a brake pedal shaft 755 is fixed to the rear surface (toward the cockpit seat 8) of a board supporting plate (air-cut plate) 901. A proximal boss part 35a of the brake pedal 35 is fitted onto the brake pedal shaft 755 in such a manner that the proximal boss part 35a of the brake pedal 35 is integrally rotatably coupled to the brake pedal shaft 755.

Pedal shaft arms 756 projecting forward are fixed to both ends of the brake pedal shaft 755. The pedal shaft arms 756 rotate together with the brake pedal shaft 755. A proximal boss part of the clutch pedal 37 is also rotatably fitted onto the brake pedal shaft 755. A clutch position sensor 829 (see FIG. 13) and a brake position sensor 828 are fixed to each of the left and right ends of the brake pedal shaft 755. A brake switch 851 is disposed at a position facing a pedal arm 35*b* of the brake pedal 35, whereas a clutch switch 852 (see FIG. 13) is disposed at a position facing a pedal arm 37*b* of the clutch pedal 37.

A pair of laterally oriented left and right brake operating shafts 757 are supported on left and right lower portions of the board supporting plate (air-cut plate) 901. A link boss member 758 coupled to a braking arm 752 of the brake mechanism 751 in the turning transmission case 13 is rotatably fitted onto the left brake operating shaft 757. The lower end of a vertically elongated link rod 762 coupled to the left pedal shaft arm 756 and the upper end of a two-stage extension link member 763 that makes a braking operation of the brake mechanism 751 stepwise are coupled to a link arm 759 projecting from the outer peripheral surface of the link boss member 758. The lower end of the two-stage extension link member 763 is coupled to the front end of a link arm 767 at the rear end of a brake rod 766. The brake rod 766 is supported by link supporting brackets 764 and 765 fixed to the engine frame 14, and extends longitudinally. A link arm 768 at the front end of the brake rod 766 is coupled to the braking arm 752 of the brake mechanism 751 in the turning transmission case 13 through a coupling plate 753.

That is, the left end of the brake pedal shaft 755 is coupled to the braking arm 752 of the brake mechanism 751 through the link rod 762, the two-stage extension link member 763, and the brake rod 766. Thus, rotation of the brake pedal shaft 755 with pressing of the brake pedal 35 can rotate the braking arm 752 so that a braking operation of the brake mechanism 751 can be executed. At this time, the action of the two-stage extension link member 763 increases a pedaling force to the brake pedal 35 in a case where the amount of pressing for hard braking is large (in a braking range of the brake mechanism 751), as compared to a case where the amount of pressing for adjusting the traveling speed is small (in a play range of the brake mechanism 751).

A link boss member 760 including the link arm 761 is rotatably fitted onto the right brake operating shaft 757. The upper end of the two-stage extension link member 769 making the pressing to the brake pedal 35 stepwise is coupled to the right pedal shaft arm 756. The lower end of the two-stage extension link member 769 is coupled to the link arm 761 projecting from the outer peripheral surface of the link boss member 760. With the pressing to the brake pedal 35, when the brake operating shaft 757 is rotated, the two-stage extension link member 769 is exerted. Accordingly, the pedaling force to the brake pedal 35 is increased in the case where the amount of pressing for hard braking is large (in the braking range of the brake mechanism 751), as compared to the case where the amount of pressing for adjusting the traveling speed is small (in the play range of the brake mechanism 751).

The parking brake lever 43 is coupled to an end of a locking member 771 through a parking brake arm 770. The shaft of the locking member 771 having an arc shape in side view is fixed to the brake pedal supporting bracket 916. A locking board 775 to be locked with a locking hook of the locking member 771 is provided on the left side surface of the pedal arm 35*b* of the brake pedal 35. Accordingly, an operation of the parking brake lever 43 with the brake pedal 35 being pressed causes the locking member 771 to be locked with the locking board 775 so that a braking state (parking state) of the tractor 1 is maintained.

Then, with reference mainly to FIGS. 4 through 6, 10, and 11, internal configurations of the straight-traveling transmission case 17 and the turning transmission case 13 and a power transmission system of the tractor 1 will be described. A front chamber of the straight-traveling transmission case 17 houses a hydraulic mechanical stepless transmission 500 for straight-traveling, a mechanical creep transmission gear mechanism 502 and a mechanical traveling sub-transmission gear mechanism 503. The creep transmission gear mechanism 502 and the traveling sub-transmission gear mechanism 503 shift the speed of the rotative force transmitted by way of a forward-reverse switching mechanism 501 described later. An intermediate chamber of the straight-traveling transmission case 17 houses the forward-reverse switching mechanism 501 that switches the rotative force from the hydraulic mechanical stepless transmission 500 to a forward direction or a reverse direction. A rear chamber of the straight-traveling transmission case 17 houses a PTO transmission mechanism 505 that appropriately shifts the speed of the rotative force from the engine 5 and transmits the power to the PTO shaft 25. The creep transmission gear mechanism 502 and the traveling sub-transmission gear mechanism 503 correspond to a traveling transmission gear mechanism that achieves multistage shifting of the shifted output from the forward-reverse switching mechanism 501. A pump case 480 housing a work machine hydraulic pump 481 and a traveling hydraulic pump 482 that are driven by the rotative force of the engine 5 is attached to a front portion of the right outer surface of the straight-traveling transmission case 17.

The flywheel 26 is directly coupled to the output shaft 5*a* of the engine 5 projecting rearward from the rear side surface of the engine 5. The input counter shaft 28 projecting forward from the front surface of the straight-traveling transmission case 17 is coupled to the main driving shaft 27 projecting rearward from the flywheel 26 through the driving force transmission shaft 29 including universal joints on both ends thereof. The rotative force of the engine 5 is transmitted to the input counter shaft 28 of the straight-traveling transmission case 17 through the main driving shaft 27 and the driving force transmission shaft 29, and appropriately subjected to speed change by the hydraulic mechanical stepless transmission 500 and the creep transmission gear mechanism 502 or the traveling sub-transmission gear mechanism 503. The shifted driving force from the creep transmission gear mechanism 502 and the traveling sub-transmission gear mechanism 503 is transmitted to a gear mechanism in the turning transmission case 13 through the straight-traveling output shaft 30, the driving force transmission shaft 31, and the straight-traveling input counter shaft 508.

The straight-traveling hydraulic mechanical stepless transmission (HMT) 500 is an inline transmission in which the main transmission output shaft 512 is disposed concentrically with the main transmission input shaft 511, and a hydraulic pump unit 521, a cylinder block, a hydraulic motor unit 522 are arranged in series. A main transmission input gear 513 is fitted onto the rear end of the input counter shaft 28 to be relatively non-rotatable. An input transmission gear 514 constantly meshing with the main transmission input gear 513 is fixed to the rear end of the main transmission input shaft 511. Thus, a rotative force of the input counter shaft 28 is transmitted to the hydraulic mechanical stepless transmission 500 through the main transmission input gear 513, the input transmission gear 514, and the main transmission input shaft 511. A main transmission high-speed gear 516, a main transmission reverse gear 517, and a main transmission low-speed gear 515, for traveling output, are fitted onto the main transmission output shaft 512 to be relatively non-rotatable. An input side of the main transmission input shaft 511 and an output side of the main transmission output shaft 512 are located on the same side (each located rearward of the hydraulic mechanical stepless transmission 500).

The hydraulic mechanical stepless transmission 500 includes a variable capacity hydraulic pump unit 521 and a fixed capacity hydraulic motor unit 522 that is operated by high-pressure hydraulic oil discharged from the hydraulic pump unit 521. The hydraulic pump unit 521 includes a pump swash plate 523 whose tilt angle is changeable relative to the axis of the main transmission input shaft 511 so as to adjust a supply rate of hydraulic oil. A main transmission hydraulic cylinder 524 is cooperatively coupled to the pump swash plate 523 to adjust the tilt angle of the pump swash plate 523 relative to the axis of the main transmission input shaft 511. In the embodiment, the main transmission hydraulic cylinder 524 is assembled to the hydraulic mechanical stepless transmission 500 to be a unit as a single member.

When the main transmission hydraulic cylinder 524 is driven in proportion to the operation amount to the main transmission lever 50, the tilt angle of the pump swash plate 523 relative to the axis of the main transmission input shaft 511 is changed accordingly. The angle of the pump swash plate 523 according to the embodiment can be adjusted within a range between a maximum tilt angle on one side (positive) and a maximum tilt angle on the other side (negative) with respect to a neutral angle at which the tilt angle is substantially zero (±several degrees with respect to zero). When the vehicle speed of the traveling body 2 is lowest, the pump swash plate 523 is tilted to one of the sides (a tilt angle close to the maximum negative angle in this case).

While the tilt angle of the pump swash plate 523 is substantially zero (neutral angle), the hydraulic pump unit 521 does not cause pressing or pulling of the group of input-side plungers. The cylinder block rotates in the same direction at substantially the same speed as the main transmission input shaft 511, but because no hydraulic oil is supplied from the hydraulic pump unit 521, the group of output-side plungers of the cylinder block, and further the hydraulic motor unit 522, are not driven so that the main transmission output shaft 512 rotates at substantially the same rotation speed as the main transmission input shaft 511.

A mechanism for switching between forward and reverse that is executed through the forward-reverse switching mechanism 501 will now be described. A planetary gear mechanism 526 as a forward high-speed gear mechanism and a low-speed gear pair 525 as a forward low-speed gear mechanism are disposed on a lower portion of the input counter shaft 28. The planetary gear mechanism 526 includes: a sun gear 531 that integrally rotates with an input side transmission gear 529 rotatably supported on the input counter shaft 28; a carrier 532 rotatably supporting a plurality of planetary gears 533 on the same radius; and a ring gear 534 having an inner circumferential surface provided with internal teeth. The sun gear 531 and the ring gear 534 are rotatably fitted onto the input counter shaft 28. The carrier 532 is fitted onto the input counter shaft 28 to be relatively non-rotatable. The sun gear 531 meshes with the planetary gears 533 of the carrier 532 from the radially inner side. The internal teeth of the ring gear 534 mesh with the planetary gears 533 from the radially outer side. The input counter shaft 28 rotatably supports an output-side transmission gear 530 that rotates integrally with the ring gear 534. An input-side low-speed gear 527 and an output-side low-speed gear 528 constituting the low-speed gear pair 525 have an integrated structure, and are rotatably supported on a portion of the input counter shaft 28 between the planetary gear mechanism 526 and the main transmission input gear 513.

The straight-traveling transmission case 17 houses the input counter shaft 28, a traveling relay shaft 535, and a traveling transmission shaft 536. The traveling relay shaft 535 and the traveling transmission shaft 536 extend in parallel with the main transmission input shaft 511 and the main transmission output shaft 512. The forward-reverse switching mechanism 501 is disposed on the traveling relay shaft 535 as a transmission shaft. That is, a forward high-speed gear 540 coupled by a multiplate wet forward high-speed hydraulic clutch 539, a reverse-traveling gear 542 coupled by a multiplate wet reverse hydraulic clutch 541, and a forward low-speed gear 538 coupled by a multiplate wet forward low-speed hydraulic clutch 537 are fitted onto the traveling relay shaft 535. A traveling relay gear 543 is fitted onto a portion of the traveling relay shaft 535 between the forward high-speed hydraulic clutch 539 and the reverse-traveling gear 542 to be relatively non-rotatable. A traveling transmission gear 544 constantly meshing with the traveling relay gear 543 is fitted onto the traveling transmission shaft 536 to be relatively non-rotatable. The main transmission low-speed gear 515 of the main transmission output shaft 512 constantly meshes with the input-side low-speed gear 527 of the low-speed gear pair 525 on the input counter shaft 28, and the output-side low-speed gear 528 constantly meshes with the forward low-speed gear 538. The main transmission high-speed gear 516 of the main transmission output shaft 512 constantly meshes with the input-side transmission gear 529 of the planetary gear mechanism 526 on the input counter shaft 28, and the output-side transmission gear 530 constantly meshes with the forward high-speed gear 540. The main transmission reverse gear 517 of the main transmission output shaft 512 constantly meshes with the reverse-traveling gear 542.

When the forward-reverse switching lever 36 is operated to the forward side, the forward low-speed hydraulic clutch 537 or the forward high-speed hydraulic clutch 539 comes to be in a driving force connected state, and the forward low-speed gear 538 or the forward high-speed gear 540 is coupled to the traveling relay shaft 535 to be relatively non-rotatable. As a result, a forward low-speed or forward high-speed rotative force is transmitted from the main transmission output shaft 512 to the traveling relay shaft 535 through the low-speed gear pair 525 or the planetary gear mechanism 526, and thereby, the driving force is transmitted from the traveling relay shaft 535 to the traveling transmission shaft 536. When the forward-reverse switching lever 36 is operated to the rearward side, the reverse hydraulic clutch 541 comes to be in a driving force connected state, and the reverse-traveling gear 542 is coupled to the traveling relay shaft 535 to be relatively non-rotatable. As a result, a reverse-traveling rotative force is transmitted from the main transmission output shaft 512 to the traveling relay shaft 535 through the main transmission reverse gear 517 and the reverse-traveling gear 542, and thus, the driving force is transmitted from the traveling relay shaft 535 to the traveling transmission shaft 536.

Figure 10:
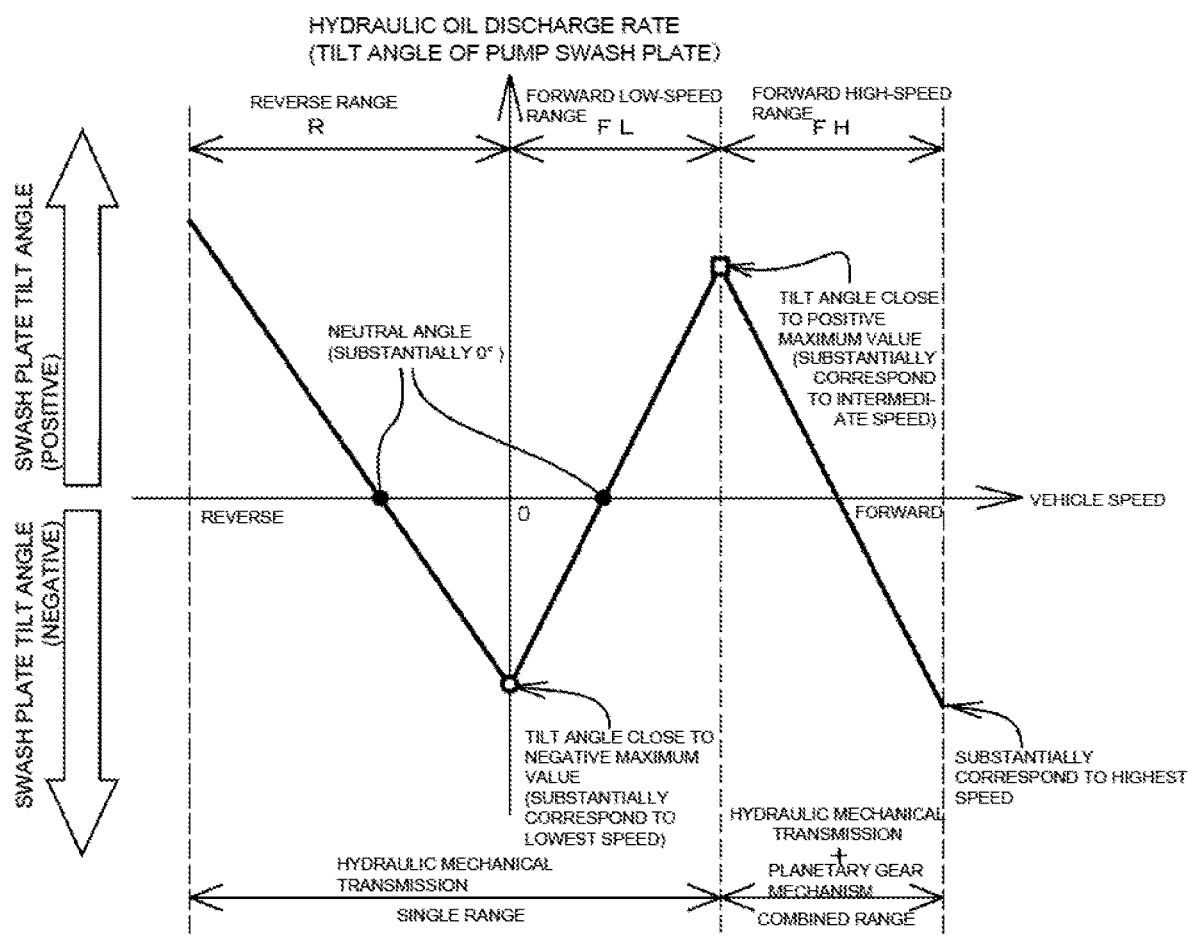
Figure 11:
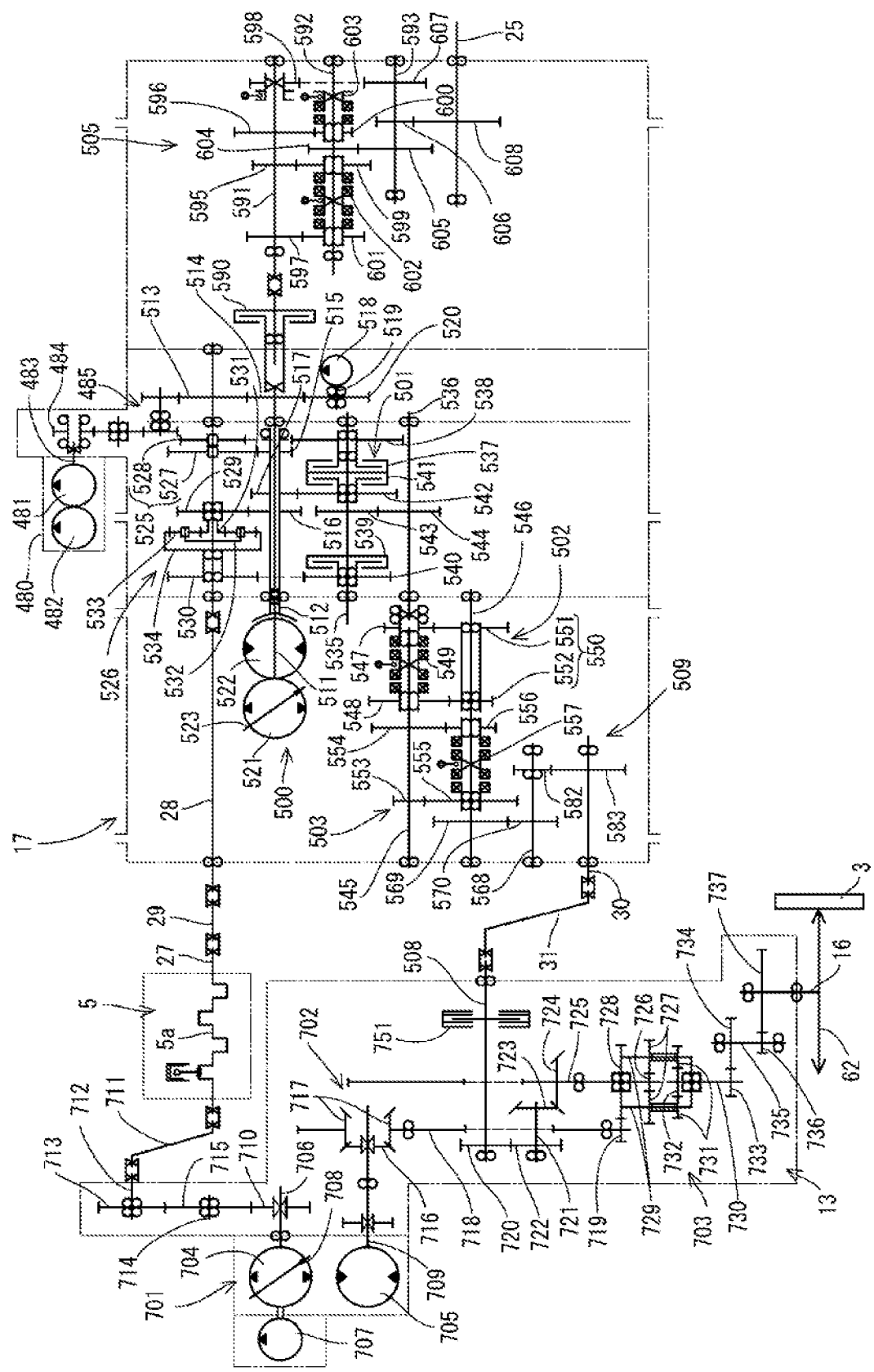

Which one of the forward low-speed hydraulic clutch 537 and the forward high-speed hydraulic clutch 539 comes to be in the driving force connected state by the forward operation of the forward-reverse switching lever 36 is determined depending on the amount of operation of the main transmission lever 50. While the forward-reverse switching lever 36 is in a neutral position, all the hydraulic clutches 537, 539, and 541 are in driving force disconnected states, and a traveling driving force from the main transmission output shaft 512 is substantially zero (in a main clutch disengaged state). Here, FIG. 10 shows a relationship between the discharge rate of hydraulic oil (tilt angle of the pump swash plate 523) of the hydraulic mechanical stepless transmission 500 and the vehicle speed of the tractor 1. In the embodiment, in a case where a neutral operation is performed on the main transmission lever 50 irrespectively of the operating state of the forward-reverse switching lever 36, driving of the main transmission hydraulic cylinder 524 causes the pump swash plate 523 to be tilted at a negative tilt angle close to the maximum (reverse tilt angle) (see an outline circle mark) and the main transmission output shaft 512 and the traveling relay shaft 535 to rotate at lowest rotation speeds (substantially zero). Consequently, the vehicle speed of the tractor 1 becomes substantially zero.

In a case where the main transmission lever 50 is operated toward an accelerating side from neutral to an approximately intermediate speed with the forward-reverse switching lever 36 operated toward the forward traveling side, the main transmission hydraulic cylinder 524 is driven in such a manner that the tilt angle of the pump swash plate 523 changes from an approximately maximum negative tilt angle (reverse tilt angle) to zero and to an approximately maximum positive tilt angle (normal tilt angle) (see the outline square mark) so that the shifted driving force from the hydraulic motor unit 522 to the main transmission output shaft 512 is accelerated from substantially zero to a high speed. At this time, the forward low-speed hydraulic clutch 537 changes to the driving force connected state, and the forward low-speed gear 538 or the forward high-speed gear 540 and the traveling relay shaft 535 are coupled to each other to be relatively non-rotatable. As a result, a forward low-speed rotative force is transmitted from the main transmission output shaft 512 to the traveling relay shaft 535 through the low-speed gear pair 525. Accordingly, a driving force for acceleration is transmitted to the main transmission output shaft 512 so that the traveling relay shaft 535 changes from a lowest rotation speed state to a forward intermediate rotation speed state (see a forward low-speed range FL). Then, the driving force is transmitted from the traveling relay shaft 535 to the traveling transmission shaft 536.

In a case where the main transmission lever 50 is operated toward the accelerating side from the intermediate speed to an approximately highest speed with the forward-reverse switching lever 36 operated toward the forward traveling side, the main transmission hydraulic cylinder 524 is driven in such a manner that the tilt angle of the pump swash plate 523 changes from an approximately maximum positive tilt angle (normal tilt angle) to zero and to an approximately maximum negative tilt angle (reverse tilt angle) so that the shifted driving force from the hydraulic motor unit 522 to the main transmission output shaft 512 decreases from a high speed to substantially zero. At this time, the forward high-speed hydraulic clutch 539 changes to the driving force connected state, and the forward high-speed gear 540 is coupled to the traveling relay shaft 535 to be relatively non-rotatable. As a result, a forward high-speed rotative force is transmitted from the main transmission output shaft 512 to the traveling relay shaft 535 through the planetary gear mechanism 526. That is, in the planetary gear mechanism 526, the driving force from the engine 5 and the decelerating driving force to the main transmission output shaft 512 are combined, and then, the resultant combined driving force causes the traveling relay shaft 535 to change from the forward intermediate rotation speed state to a forward highest rotation speed state (see forward high-speed range FH). Then, the driving force is transmitted from the traveling relay shaft 535 to the traveling transmission shaft 536. The traveling body 2 travels at the highest speed.

In a case where the main transmission lever 50 is operated from neutral toward an accelerating side with the forward-reverse switching lever 36 operated toward the reverse traveling side, the main transmission hydraulic cylinder 524 is driven in such a manner that the tilt angle of the pump swash plate 523 changes from an approximately maximum negative tilt angle (reverse tilt angle) to zero and to an approximately maximum positive tilt angle (normal tilt angle), and the shifted driving force from the hydraulic motor unit 522 to the main transmission output shaft 512 is accelerated from substantially zero to a high speed. At this time, the reverse hydraulic clutch 541 changes to the driving force connected state, and the reverse-traveling gear 542 is coupled to the traveling relay shaft 535 to be relatively non-rotatable. As a result, a reverse-traveling rotative force is transmitted from the main transmission output shaft 512 to the traveling relay shaft 535 through the main transmission reverse gear 517 and the reverse-traveling gear 542. Accordingly, the driving force for acceleration is transmitted to the main transmission output shaft 512 so that the traveling relay shaft 535 changes from the lowest rotation speed state to a reverse high rotation speed state (reverse range R). Then, the driving force is transmitted from the traveling relay shaft 535 to the traveling transmission shaft 536.

Next, description will be given on a structure for switching among ultra-low speed, low speed, and high speed to be performed with the creep transmission gear mechanism 502 and the traveling sub-transmission gear mechanism 503 that are traveling transmission gear mechanisms. The straight-traveling transmission case 17 houses the mechanical creep transmission gear mechanism 502, the mechanical traveling sub-transmission gear mechanism 503, a traveling counter shaft 545 extending coaxially with the traveling transmission shaft 536, and a sub-transmission shaft 546 extending in parallel with the traveling counter shaft 545. The creep transmission gear mechanism 502 and the traveling sub-transmission gear mechanism 503 shift the speed of the rotative force transmitted by way of a forward-reverse switching mechanism 501.

A transmission gear 547 and a creep gear 548 are disposed on a rear portion of the traveling counter shaft 545. The transmission gear 547 is rotatably fitted onto the traveling counter shaft 545, and coupled to the traveling transmission shaft 536 so that the transmission gear 547 rotates integrally with the traveling transmission shaft 536. The creep gear 548 is fitted onto the traveling counter shaft 545 to be relatively non-rotatable. A creep shifter 549 is spline-fitted to a portion of the traveling counter shaft 545 between the transmission gear 547 and the creep gear 548 to be relatively non-rotatable and slidable in the axial direction. When the ultra-low speed lever 44 is operated to turn on or off, the creep shifter 549 slides in such a manner that the transmission gear 547 or the creep gear 548 is selectively coupled to the traveling counter shaft 545. A deceleration gear pair 550 is rotatably fitted onto a portion of the sub-transmission shaft 546 inside the front chamber. An input-side deceleration gear 551 and an output-side deceleration gear 552 constituting the deceleration gear pair 550 have an integrated structure. The transmission gear 547 of the traveling counter shaft 545 constantly meshes with the input-side deceleration gear 551 of the sub-transmission shaft 546. The creep gear 548 constantly meshes with the output-side deceleration gear 552.

A low-speed relay gear 553 and a high-speed relay gear 554 are disposed on a front portion of the traveling counter shaft 545. The low-speed relay gear 553 is fixed to the traveling counter shaft 545. The high-speed relay gear 554 is fitted onto the traveling counter shaft 545 to be relatively non-rotatable. A low-speed gear 555 that meshes with the low-speed relay gear 553 and a high-speed gear 556 that meshes with the high-speed relay gear 554 are rotatably fitted onto a portion of the sub-transmission shaft 546 forward of the deceleration gear pair 550. A sub-transmission shifter 557 is spline-fitted to a portion of the sub-transmission shaft 546 between the low-speed gear 555 and the high-speed gear 556 to be relatively non-rotatable and slidable along the axial direction. When the sub-transmission lever 45 is operated, the sub-transmission shifter 557 slides, and the low-speed gear 555 or the high-speed gear 556 is selectively coupled to the sub-transmission shaft 546. An intermediate position between the low-speed gear 555 and the high-speed gear 556 is a sub transmission neutral position at which the high-speed gear 556 and the sub-transmission shifter 557 are disconnected to each other.

In addition, a straight-traveling relay shaft 568 and a straight-traveling output shaft 30 are disposed to extend in parallel with the traveling counter shaft 545 and the sub-transmission shaft 546. A driven gear 570 fitted onto the straight-traveling relay shaft 568 to be relatively non-rotatable constantly meshes with a driving gear 569 fitted onto the front end of the sub-transmission shaft 546 to be relatively non-rotatable. A straight-traveling output gear 583 fitted onto the straight-traveling output shaft 30 to be relatively non-rotatable constantly meshes with a straight-traveling relay gear 582 fitted onto the rear end of the straight-traveling relay shaft 568 to be relatively non-rotatable.

The driving gear 569 on the sub-transmission shaft 546, the driven gear 570 and the straight-traveling relay gear 582 on the straight-traveling relay shaft 568, and the straight-traveling output gear 583 on the straight-traveling output shaft 30 constitute a straight-traveling output gear mechanism 509 for driving-force transmission of rotation of the sub-transmission shaft 456 to the straight-traveling output shaft 30. The straight-traveling output gear mechanism 509 includes a straight-traveling pickup rotation sensor (straight-traveling vehicle speed sensor) 823, and the straight-traveling pickup rotation sensor 823 detects the number of rotations of the straight-traveling output (straight-traveling vehicle speed). For example, straight-traveling relay gear 582 and the straight-traveling pickup rotation sensor 823 are disposed to be opposed to each other so that the number of rotations of the straight-traveling output (straight vehicle speed) can be detected based on the number of rotations of the straight-traveling relay gear 582.

In the embodiment, when the ultra-low speed lever 44 is operated to turn on and the sub-transmission lever 45 is operated to a low-speed side, the creep gear 548 is coupled to the traveling counter shaft 545 to be relatively non-rotatable, and the low-speed gear 555 is coupled to the sub-transmission shaft 546 to be relatively non-rotatable so that an ultra-low speed traveling driving force is output from the straight-traveling output shaft 30 toward the turning transmission case 13. When the ultra-low speed lever 44 is operated to turn off and the sub-transmission lever 45 is operated to the low-speed side, the transmission gear 547 is coupled to the traveling counter shaft 545 to be relatively non-rotatable, and the low-speed gear 555 is coupled to the sub-transmission shaft 546 to be relatively non-rotatable so that an ultra-low speed traveling driving force is output from the straight-traveling output shaft 30 toward the turning transmission case 13. When the ultra-low speed lever 44 is operated to turn off and the sub-transmission lever 45 is operated to the high-speed side, the transmission gear 547 is coupled to the traveling counter shaft 545 to be relatively non-rotatable, and the high-speed gear 556 is coupled to the sub-transmission shaft 546 to be relatively non-rotatable so that a high speed traveling driving force is output from the straight-traveling output shaft 30 toward the turning transmission case 13. When the sub-transmission lever 45 is operated to the neutral position, the sub-transmission shaft 546 is disconnected from each of the low-speed gear 555 and the high-speed gear 556 so that a driving force from the traveling transmission shaft 536 is blocked by the sub-transmission gear mechanism 503.

The driving force transmission shaft 31 couples the straight-traveling input counter shaft 508 projecting rearward from the turning transmission case 13 and the straight-traveling output shaft 30 projecting forward from a lower portion of the front surface of the straight-traveling transmission case 17 to each other. The turning transmission case 13 includes: a turning hydraulic stepless transmission 701 for appropriately shifting the speed of the rotative force from the engine 5; a differential gear mechanism 702 for transmitting output rotation from the hydraulic stepless transmission 701 to the left and right traveling crawlers 3 (drive sprockets 62); and a pair of left and light planetary gear mechanisms 703 for combining a rotative force from the differential gear mechanism 702 and a rotative force from the straight-traveling transmission case 17.

In the hydraulic stepless transmission 701, a hydraulic pump unit 704 and a hydraulic motor unit 705 as a pair are arranged in parallel, and hydraulic oil is appropriately fed from the hydraulic pump unit 704 to the hydraulic motor unit 705 by a driving force transmitted to the pump shaft 706. A charge pump 707 for supplying hydraulic oil to the hydraulic pump unit 704 and the hydraulic motor unit 705 is attached to the pump shaft 706. The turning hydraulic stepless transmission 701 appropriately changes the tilt angle of the pump swash plate 708 in the hydraulic pump unit 704 to change the direction and amount of discharge of hydraulic oil to the hydraulic motor unit 705 and thereby to adjust the rotation direction and the number of rotations of a motor shaft 709 projecting from the hydraulic motor unit 705 to any values.

In the turning transmission case 13, the turning input counter shaft 712 is disposed in parallel with the pump shaft 706 of the hydraulic pump unit 704, and the turning input gear 713 is fitted onto the turning input counter shaft 712 to be relatively non-rotatable. The turning relay shaft 714 is disposed in parallel with the turning input counter shaft 712 and the pump shaft 706 between the turning input counter shaft 712 and the pump shaft 706, and the turning relay gear 715 constantly meshing with the turning input gear 713 is fitted onto the turning relay shaft 714 to be relatively non-rotatable. A pump input gear 710 constantly meshing with the turning relay gear 715 is fitted onto the pump shaft 706 to be relatively non-rotatable so that the rotative force transmitted from the engine 5 to the turning input counter shaft 712 is transmitted to the pump shaft 706 through the turning relay shaft 714.

In the turning transmission case 13, the differential gear mechanism 702 is constituted by a bevel gear mechanism in which a pair of left and right side gears 717 mesh with both sides of a pinion gear 716 fitted onto the rear end of the motor shaft 709 to be relatively non-rotatable. In the differential gear mechanism 702, a pair of left and right turning output shafts 718 onto which the side gears 717 are fitted to be relatively non-rotatable at one ends extend laterally sideways. A turning output gear 719 for transmitting a driving force to the pair of left and right planetary gear mechanisms 703 is fitted onto each of the other ends of a pair of left and right turning output shafts 718 to be relatively non-rotatable.

A rotative force (turning rotative force) from the hydraulic motor unit 705 output from the motor shaft 709 is branched by the differential gear mechanism 702 to be forward-reverse rotative forces, and transmitted to the pair of left and right planetary gear mechanisms 703 through the pair of left and right turning output shafts 718. That is, in the differential gear mechanism 702, the rotative force is transmitted as a reverse rotative force to the left planetary gear mechanism 703 through the left turning output shaft 718 onto which the left side gear 717 is fitted, whereas the rotative force is transmitted as a forward rotative force to the right planetary gear mechanism 703 through the right turning output shaft 718 onto which the right side gear 717 is fitted.

The hydraulic motor unit 705 of the turning hydraulic stepless transmission 701 is provided with a turning pickup rotation sensor (turning vehicle-speed sensor) 824, and the turning pickup rotation sensor 824 detects the number of rotations of a turning output (turning vehicle speed). For example, a turning pulse generating rotating wheel member is provided on the motor shaft 709, a turning pickup rotation sensor 824 is disposed to be opposed to the turning pulse generating rotating wheel member, and based on the number of rotations of the turning pulse generating rotating wheel member, the number of rotations of a straight-traveling output (turning vehicle speed) is detected.

In the turning transmission case 13, a brake mechanism 751 in cooperation with an operation of the brake pedal 35 is disposed on the straight-traveling input counter shaft 508 to which a rotative force is transmitted from the straight-traveling transmission case 17. A straight-traveling input gear 720 is fitted onto the front end of the straight-traveling input counter shaft 508 to be relatively non-rotatable. The straight-traveling relay shaft 721 is disposed in parallel with the straight-traveling input counter shaft 508, and a straight-traveling relay gear 722 constantly meshing with the straight-traveling input gear 720 is fitted onto the straight-traveling relay shaft 721 to be relatively non-rotatable.

A bevel gear mechanism in which a ring gear 724 meshes with a pinion gear 723 fitted onto the rear end of the straight-traveling relay shaft 721 to be relatively non-rotatable is provided, and the ring gear 724 is fitted onto the laterally extending straight-traveling output shaft 725 to be relatively non-rotatable. Each of both ends of the straight-traveling output shaft 725 is coupled to the pair of left and right planetary gear mechanisms 703. The rotative force (straight-traveling rotative force) from the straight-traveling transmission case 17 to be input to the straight-traveling input counter shaft 508 is transmitted to the pair of left and right planetary gear mechanisms 703 through the straight-traveling output shaft 725. When the brake mechanism 751 performs a brake operation in accordance with an operation on the brake pedal 35, a rotative force of the straight-traveling output shaft 725 is attenuated or stopped.

Each of the left and right planetary gear mechanisms 703 includes one sun gear 726, a plurality of planetary gears 727 that mesh with the sun gear 726, a ring gear 728 that meshes with the turning output gear 719, and a carrier 729 for causing the planetary gears 727 to be rotatable on the same circumference. The carriers 729 of the left and right planetary gear mechanisms 703 are opposed to each other with an interval on the same axis. The left and right sun gears 726 are fixed to both ends of the straight-traveling output shaft 725 having an intermediate portion onto which the ring gear 724 is fitted.

Each of the left and right ring gears 728 is rotatably fitted onto the straight-traveling output shaft 725, and external teeth on the outer peripheral surface mesh with the left and right turning output gears 719 to be thereby coupled to the turning output shafts 718. The carriers 729 fixed to the ring gears 728 rotatably and pivotally support the planetary gears 727. Each of the left and right carriers 729 is rotatably fitted onto a corresponding one of the left and right differential output shafts 730. Each of the left and right output-side transmission gears 731 that integrally rotate with the left and right planetary gears 727 meshes with a corresponding one of the left and right differential input gears 732 that are fitted onto the left and right differential output shafts 730 to be relatively non-rotatable. The left and right differential output shafts 730 are coupled to left and right relay shafts 735 through relay gears 733 and 734, and the left and right relay shafts 735 are coupled to the left and right vehicle shafts 16 through final gears 736 and 737.

Each of the left and right planetary gear mechanisms 703 receives the rotative force from the straight-traveling transmission case 17 through the straight-traveling relay shaft 721 and the straight-traveling output shaft 725 to cause the sun gear 726 to rotate in the same direction at the same number of rotations. That is, the left and right sun gears 726 receives the rotative force from the straight-traveling transmission case 17 as straight-traveling rotation, and transfers the received force to the differential output shafts 730 through the planetary gears 727 and the output-side transmission gears 731. Thus, the rotative force transmitted from the straight-traveling transmission case 17 to the left and right planetary gear mechanisms 703 is transmitted from the left and right vehicle shafts 16 to the drive sprockets 62 in the same direction with the same number of rotations, and the left and right traveling crawlers 3 are driven in the same direction with the same number of rotations so that the traveling body 2 is caused to move straight (forward or reverse).

On the other hand, the left and right planetary gear mechanisms 703 receives a rotative force from the hydraulic motor unit 705 through the differential gear mechanism 702 and the turning output shafts 718 to cause the ring gears 728 to rotate with the same number of rotations in opposite directions. That is, the left and right ring gears 728 receive rotative forces from the hydraulic motor unit 705 as turning rotations, the carrier 729 superimposes the turning rotation on the straight-traveling rotation from the sun gear 726, and rotates the planetary gears 727 and the output-side transmission gears 731. In this manner, a rotative force obtained by adding the turning rotation to the straight-traveling rotation is transmitted to one of the left and right differential output shafts 730 through the planetary gears 727 and the output-side transmission gears 731, whereas a rotative force obtained by subtracting the turning rotation from the straight-traveling rotation is transmitted to the other one of the left and right differential output shafts 730 through the planetary gears 727 and the output-side transmission gears 731.

Shifted outputs from the straight-traveling input counter shaft 508 and the motor shaft 709 are transmitted to the drive sprockets 62 of the left and right traveling crawlers 3 by way of the left and right planetary gear mechanisms 703, and the vehicle speed (traveling speed) and the traveling direction of the traveling body 2 are determined. That is, when the rotative force from the straight-traveling transmission case 17 is input to the straight-traveling input counter shaft 508 in a state where the hydraulic motor unit 705 of the hydraulic stepless transmission 701 is stopped and the left and right ring gears 728 are made stationary and fixed, rotation of the straight-traveling input counter shaft 508 is transmitted to the left and right sun gears 726 with the same number of rotations at the left and right, and the left and right traveling crawlers 3 are driven in the same direction with the same number of rotations so that the traveling body 2 travels straight.

On the other hand, in a case where rotation by the straight-traveling output shaft 30 of the straight-traveling transmission case 17 is stopped so that the left and right sun gears 726 are made stationary and fixed, when the hydraulic motor unit 705 of the hydraulic stepless transmission 701 is driven, a rotative force of the motor shaft 709 causes the left ring gear 728 to rotate forward (rotate reversely) and the right ring gear 728 to rotate reversely (rotate forward). As a result, one of the drive sprockets 62 of the left and right traveling crawlers 3 rotates forward, and the other rotates reversely so that the traveling body 2 turns on the spot (spin turn).

When the left and right ring gears 728 are driven by turning rotation of the hydraulic motor unit 705 of the hydraulic stepless transmission 701 with the left and right sun gears 726 being driven by straight-traveling rotation from the straight-traveling transmission case 17, a difference occurs between the speeds of the left and right traveling crawlers 3, and the traveling body 2 turns left or right (U turn) with a turning radius larger than a spin turn radius while traveling forward or reversely. The turning radius at this time is determined depending on the speed difference between the left and right traveling crawlers 3.

Description will now be given on a structure for switching a driving speed of the PTO shaft 25 that is performed through the PTO transmission mechanism 505 (three stages in the normal rotation direction and a single stage in the reverse rotation direction). In the straight-traveling transmission case 17, a PTO transmission mechanism 505 for transmitting a driving force from the engine 5 to the PTO shaft 25 is disposed. In this case, a PTO input shaft 591 extending coaxially with the main transmission input shaft 511 is coupled to the rear end of the main transmission input shaft 511 through a PTO hydraulic clutch 590 for engaging/disengaging transmission of a driving force. The straight-traveling transmission case 17 houses a PTO shifting shaft 592, a PTO counter shaft 593, and a PTO shaft 25 extending in parallel with the PTO input shaft 591. The PTO shaft 25 projects rearward from the rear surface of the straight-traveling transmission case 17.

When the PTO clutch switch 53 is operated for transmitting a driving force, the PTO hydraulic clutch 590 changes to a driving force connected state so that the main transmission input shaft 511 and the PTO input shaft 591 are coupled to each other to be relatively non-rotatable. As a result, a rotative force is transmitted from the main transmission input shaft 511 to the PTO input shaft 591. The PTO input shaft 591 is provided with an intermediate-speed input gear 597, a low-speed input gear 595, a high-speed input gear 596, and a reversing shifter gear 598 that are disposed in this order from the front. The intermediate-speed input gear 597, the low-speed input gear 595, and the high-speed input gear 596 are fitted onto the PTO input shaft 591 to be relatively non-rotatable. The reversing shifter gear 598 is spline-fitted to the PTO input shaft 591 to be relatively non-rotatable and slidable in the axial direction.

On the other hand, a PTO intermediate-speed gear 601 that meshes with the intermediate-speed input gear 597, a PTO low-speed gear 599 that meshes with the low-speed input gear 595, and a PTO high-speed gear 600 that meshes with the high-speed input gear 596 are rotatably fitted onto the PTO shifting shaft 592. A pair of front and rear PTO transmission shifters 602 and 603 is spline-fitted to the PTO shifting shaft 592 to be relatively non-rotatable and slidable in the axial direction. The first PTO transmission shifter 602 is disposed between the PTO intermediate-speed gear 601 and the PTO low-speed gear 599. The second PTO transmission shifter 603 is disposed rearward of the PTO high-speed gear 600. The pair of front and rear PTO transmission shifters 602 and 603 is configured to slide in the axial direction in cooperation with an operation on the PTO transmission lever 46. A PTO transmission gear 604 is fixed to a portion of the PTO shifting shaft 592 between the PTO low-speed gear 599 and the PTO high-speed gear 600.

A PTO counter gear 605 that meshes with the PTO transmission gear 604, a PTO relay gear 606 that meshes with a PTO output gear 608 fitted onto the PTO shaft 25 to be relatively non-rotatable, and a PTO reverse gear 607 are fitted onto the PTO counter shaft 593 to be relatively non-rotatable. When a sub-PTO lever 48 is operated to turn on in a state where the PTO transmission lever 46 is in the state of having been operated to be in neutral, the reversing shifter gear 598 slides to mesh with the PTO reverse gear 607 of the PTO counter shaft 593.

When the PTO transmission lever 46 is operated for shifting, the pair of front and rear PTO transmission shifters 602 and 603 slides along the PTO shifting shaft 592 so that one of the PTO low-speed gear 599, the PTO intermediate-speed gear 601, and the PTO high-speed gear 600 is selectively coupled to the PTO shifting shaft 592. As a result, PTO shifted outputs corresponding to the low speed through the high speed are transmitted from the PTO shifting shaft 592 to the PTO counter shaft 593 through the PTO transmission gear 604 and the PTO counter gear 605, and then to the PTO shaft 25 through the PTO relay gear 606 and the PTO output gear 608.

When the sub-PTO lever 48 is operated to turn on, the reversing shifter gear 598 meshes with the PTO reverse gear 607, and a rotative force of the PTO input shaft 591 is transmitted to the PTO counter shaft 593 through the reversing shifter gear 598 and the PTO reverse gear 607. Then, a reverse PTO shifted output is transmitted from the PTO counter shaft 593 to the PTO shaft 25 through the PTO relay gear 606 and the PTO output gear 608.

Figure 12:
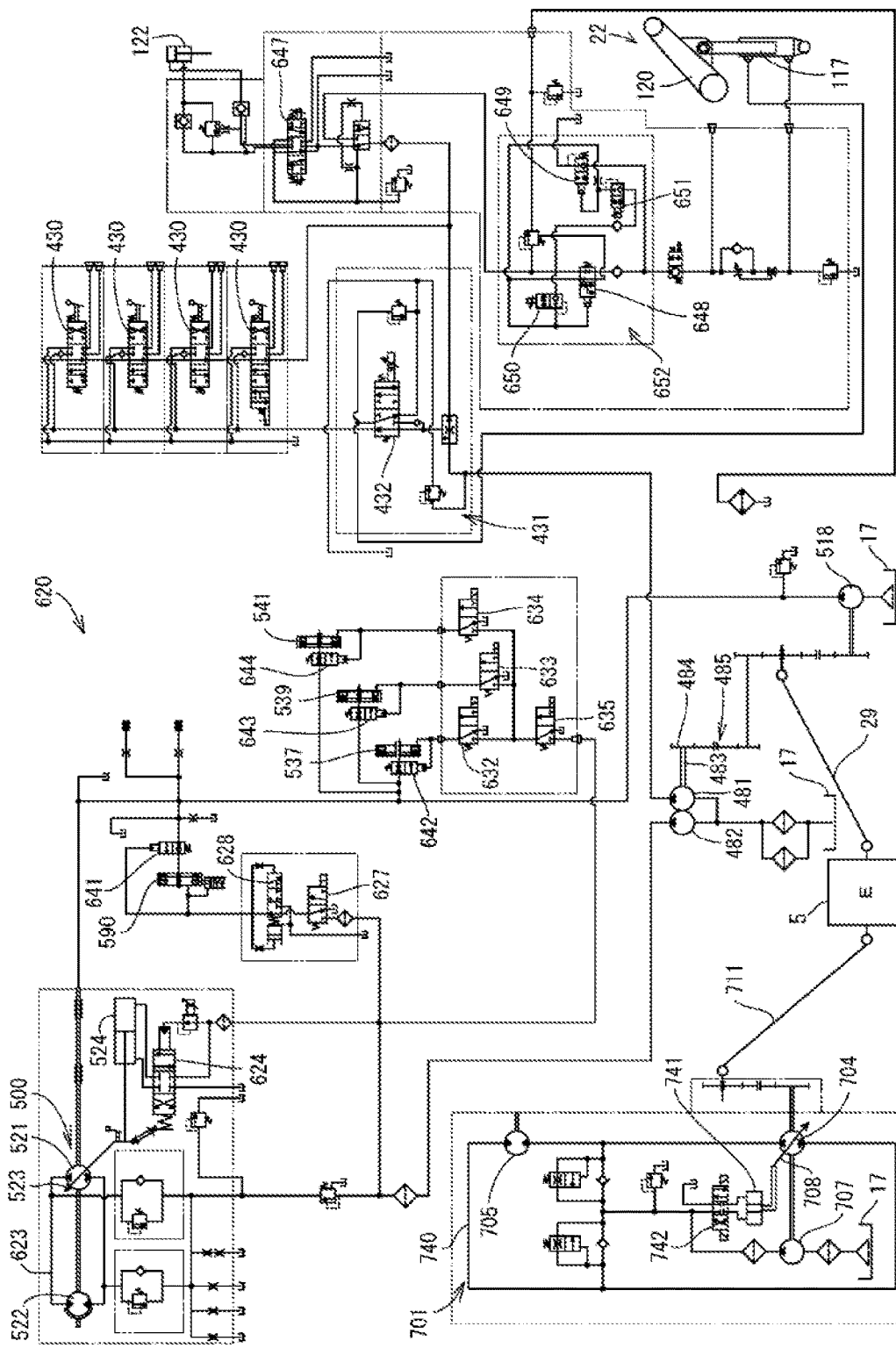

Next, with reference to FIG. 12, a configuration of a hydraulic circuit 620 of the tractor 1 will be described. The hydraulic circuit 620 of the tractor 1 includes the work machine hydraulic pump 481 and the traveling hydraulic pump 482 that are driven by a rotative force of the engine 5. In the embodiment, the straight-traveling transmission case 17 is used as a hydraulic oil tank, and hydraulic oil in the straight-traveling transmission case 17 is supplied to the work machine hydraulic pump 481 and the traveling hydraulic pump 482. The traveling hydraulic pump 482 is connected to a closed loop oil path 623 connecting the hydraulic pump unit 521 and the hydraulic motor unit 522 in the straight-traveling hydraulic mechanical stepless transmission 500. While the engine 5 is being driven, hydraulic oil from the traveling hydraulic pump 482 is constantly supplied to the closed loop oil path 623.

The traveling hydraulic pump 482 is connected to a main transmission hydraulic switching valve 624 for the main transmission hydraulic cylinder 524 of the hydraulic mechanical stepless transmission 500, a PTO clutch solenoid valve 627 for the PTO hydraulic clutch 590, and a switching valve 628 that is operated by the valve 627. In addition, the traveling hydraulic pump 482 is also connected to a forward low-speed clutch solenoid valve 632 for operating the forward low-speed hydraulic clutch 537, a forward high-speed clutch solenoid valve 633 for operating the forward high-speed hydraulic clutch 539, a reverse clutch solenoid valve 634 for operating the reverse hydraulic clutch 541, and a master control solenoid valve 635 for controlling hydraulic oil supply to the clutch solenoid valves 632 through 634.

The work machine hydraulic pump 481 is connected to the plurality of hydraulic pressure output valves 430 stacked on the upper surface of the hydraulic lifting and lowering mechanisms 22 on a rear portion of the upper surface of the straight-traveling transmission case 17, a double-acting control solenoid valve 432 for controlling supply of hydraulic oil to lower portions of the hydraulic lift cylinders 117 in the hydraulic lifting and lowering mechanisms 22, a tilt control solenoid valve 647 for controlling supply of hydraulic oil to a horizontal cylinder 122 disposed on the right lift rod 121, a lifting hydraulic switching valve 648 and a lowering hydraulic switching valve 649 for controlling supply of hydraulic oil to the lower portions of the hydraulic lift cylinders 117 in the hydraulic lifting and lowering mechanisms 22, a lifting control solenoid valve 650 for actuating switching of the lifting hydraulic switching valve 648, and a lowering control solenoid valve 651 for actuating the lowering hydraulic switching valve 649. The double-acting valve mechanism 431 is constituted by a hydraulic circuit including the double-acting control solenoid valve 432. The lifting and lowering valve mechanism 652 is constituted by a hydraulic circuit including the lifting and lowering hydraulic switching valves 648 and 649 and the lifting and lowering control solenoid valves 650 and 651.

When the tilt control solenoid valve 647 is driven to switch, the horizontal cylinder 122 extends or contracts so that the right lower link 23 is lifted or lowered using a lower link pin in a front portion as a fulcrum. Consequently, the ground work machine tilts laterally relative to the traveling body 2 through the left and right lower links 23 so that the lateral tilt angle of the ground work machine changes. The control of switching of the double-acting control solenoid valve 432 enables selection of one of a single acting type or a double acting type as a driving type of the hydraulic lift cylinders 117. That is, the driving type of the hydraulic lift cylinders 117 is set by switching the double-acting control solenoid valve 432 in accordance with the switching operation of the single-double acting shift switch 56.

In the case of driving the hydraulic lift cylinders 117 in a single-acting manner, when the lifting hydraulic switching valve 648 or the lowering hydraulic switching valve 649 is operated to switch, the hydraulic lift cylinders 117 extend or contract, and both the lift arms 120 and the left and right lower links 23 are lifted or lowered. Consequently, the ground work machine is lifted and lowered so that the height position in lifting or lowering the ground work machine changes. On the other hand, in the case of driving the hydraulic lift cylinders 117 in a double-acting manner, the double-acting control solenoid valve 432 is operated to switch concurrently with the switching operation of the lifting hydraulic switching valve 648 or the lowering hydraulic switching valve 649 so that the hydraulic lift cylinders 117 extend or contract. In this manner, the ground work machine can be lifted and lowered so that the ground work machine is subjected to a pressure toward the ground when being lowered, and thereby, can be maintained at a lowered position.

The hydraulic circuit 620 of the tractor 1 includes the charge pump 707 that is driven by a rotative force of the engine 5. The charge pump 707 is connected to a closed loop oil path 740 connecting the hydraulic pump unit 704 and the hydraulic motor unit 705 to each other in the turning hydraulic stepless transmission 701. In the embodiment, the straight-traveling transmission case 17 is used as a hydraulic oil tank, and hydraulic oil in the straight-traveling transmission case 17 is supplied to the charge pump 707. While the engine 5 is being driven, hydraulic oil from the charge pump 707 is constantly supplied to the closed loop oil path 740. The hydraulic circuit 620 of the tractor 1 includes a turning hydraulic cylinder 741 for changing the angle of the pump swash plate 708 of the hydraulic pump unit 704 in the hydraulic stepless transmission 701, and a turning hydraulic switching valve 742 for the turning hydraulic cylinder 741.

The hydraulic circuit 620 of the tractor 1 also includes a lubricating oil pump 518 that is driven by a rotative force of the engine 5, in addition to the work machine hydraulic pump 481 and the traveling hydraulic pump 482. The lubricating oil pump 518 is connected to a PTO clutch hydraulic switching valve 641 for supplying hydraulic oil (lubricating oil) to a lubricating part of the PTO hydraulic clutch 590, a lubricating part of the main transmission input shaft 511 pivotally supporting the hydraulic mechanical stepless transmission 500, a forward low-speed clutch hydraulic switching valve 642 for supplying hydraulic oil (lubricating oil) to a lubricating part of the forward low-speed hydraulic clutch 537, a forward high-speed clutch hydraulic switching valve 643 for supplying hydraulic oil (lubricating oil) to a lubricating part of the forward high-speed hydraulic clutch 539, and a reverse clutch hydraulic switching valve 644 for supplying hydraulic oil (lubricating oil) to a lubricating part of the reverse hydraulic clutch 541. The hydraulic circuit 620 includes a relief valve, a flow-rate control valve, a check valve, an oil cooler, an oil filter, and so forth.

Figure 13:
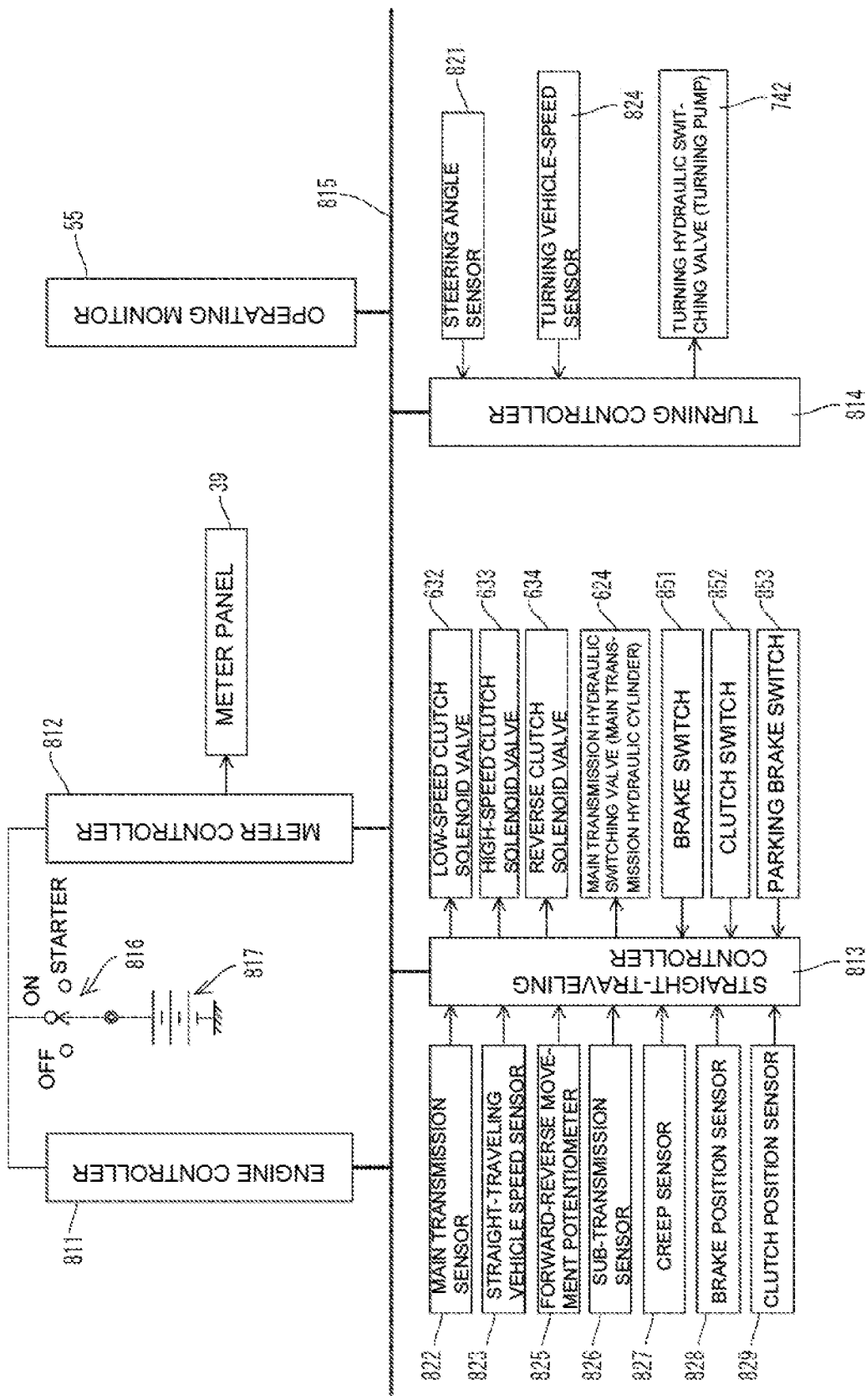

Thereafter, with reference to FIGS. 13 through 16, a configuration for executing traveling control of the tractor 1 will be described. As illustrated in FIG. 13, the tractor 1 includes: an engine controller 811 for controlling driving of the engine 5; a meter controller 812 for controlling a display operation of an operation display board (meter panel) 39 mounted on the dashboard 33; and a straight-traveling controller 813; and a turning controller 814. The straight-traveling controller 813 and the turning controller 814 are used for controlling the speed of the traveling body 2, for example.

Each of the controllers 811 through 814 and the operating monitor 55 includes, in addition to a CPU for executing various computation processes and control, a ROM for storing a control program and data, a RAM for temporarily storing a control program and data, a timer for counting the time, an input/output interface, and so forth, and is connected to each other through a CAN communication bus 815 so that these controllers and the monitor can communicate with one another. The engine controller 811 and the meter controller 812 are connected to a battery 817 through a power supply application key switch 816.

Based on control by the engine controller 811, in the engine 5, fuel in the fuel tank is pumped to a common rail by a fuel pump, and is stored in the common rail as high-pressure fuel. Then, the engine controller 811 controls (electronically controls) opening and closing of each fuel injection valve so that the high-pressure fuel in the unillustrated common rail is injected from injectors (not shown) to cylinders of the engine 5 under highly accurate control of injection pressure, injection timing, and injection period (injection amount).

A liquid crystal panel and various alarm lamps on the meter panel 39 are connected to an output side of the meter controller 812. The meter controller 812 outputs various signals to the meter panel 39, and controls lighting and extinguishing operations and blinking operations of the alarm lamps, display operations of the liquid crystal panel, and a warning operation of an alarm buzzer.

The main transmission sensor (main transmission potentiometer) 822 for detecting an operation position of the main transmission lever 50, the straight-traveling pickup rotation sensor (straight-traveling vehicle speed sensor) 823 for detecting the number of rotations of a straight-traveling output (straight-traveling vehicle speed), a forward-reverse movement sensor (forward-reverse movement potentiometer) 825 for detecting an operation position of the forward-reverse switching lever 36, a sub-transmission sensor 826 for detecting an operation position of the sub-transmission lever 45, a creep sensor 827 for detecting an operation position of the ultra-low speed lever 44, a brake position sensor 828 for detecting the amount of pressing of the brake pedal 35, a clutch position sensor 829 for detecting the amount of pressing of the clutch pedal 37, a brake switch 851 for detecting pressing of the brake pedal 35, the clutch switch 852 for detecting pressing of the clutch pedal 37, and a parking brake switch 853 for detecting an operation of the parking brake lever 43 are connected to an input side of the straight-traveling controller 813.

The forward low-speed clutch solenoid valve 632 for actuating the forward low-speed hydraulic clutch 537, the forward high-speed clutch solenoid valve 633 for actuating the forward high-speed hydraulic clutch 539, the reverse clutch solenoid valve 634 for actuating the reverse hydraulic clutch 541, and the main transmission hydraulic switching valve 624 for actuating the main transmission hydraulic cylinder 524 in accordance with the amount of a tilt operation of the main transmission lever 50 are connected to an output side of the straight-traveling controller 813.

The steering angle sensor (steering potentiometer) 821 for detecting the amount of rotation (steering angle) of the steering wheel 9 and the turning pickup rotation sensor (turning vehicle speed sensor) 824 for detecting the number of rotations (turning vehicle speed) of a turning output are connected to an input side of the turning controller 814. On the other hand, the turning hydraulic switching valve 742 for actuating the turning hydraulic cylinder 741 in accordance with the amount of rotation operation on the steering wheel 9 is connected to an output side of the turning controller 814.

Figure 14:
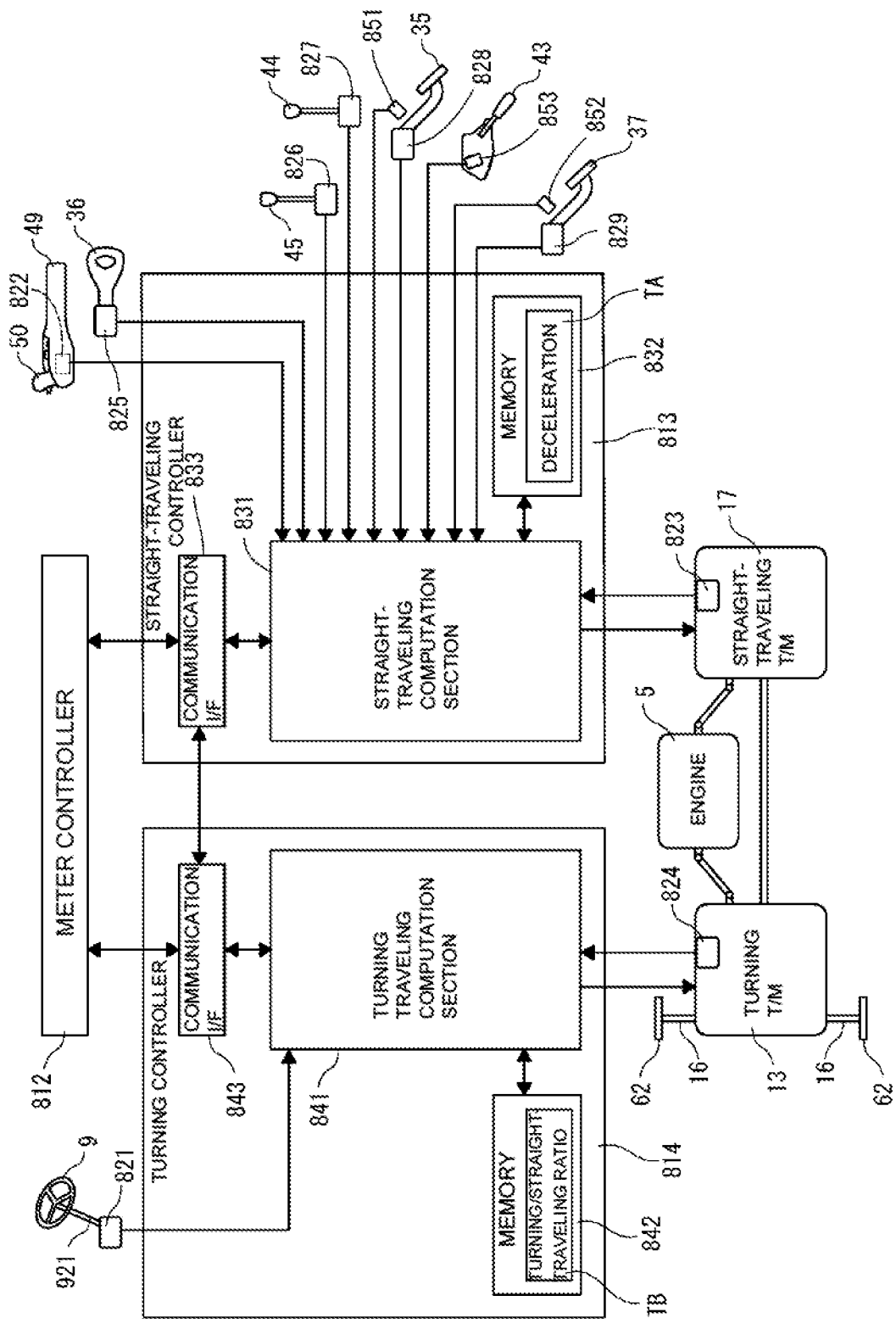
Figure 15:
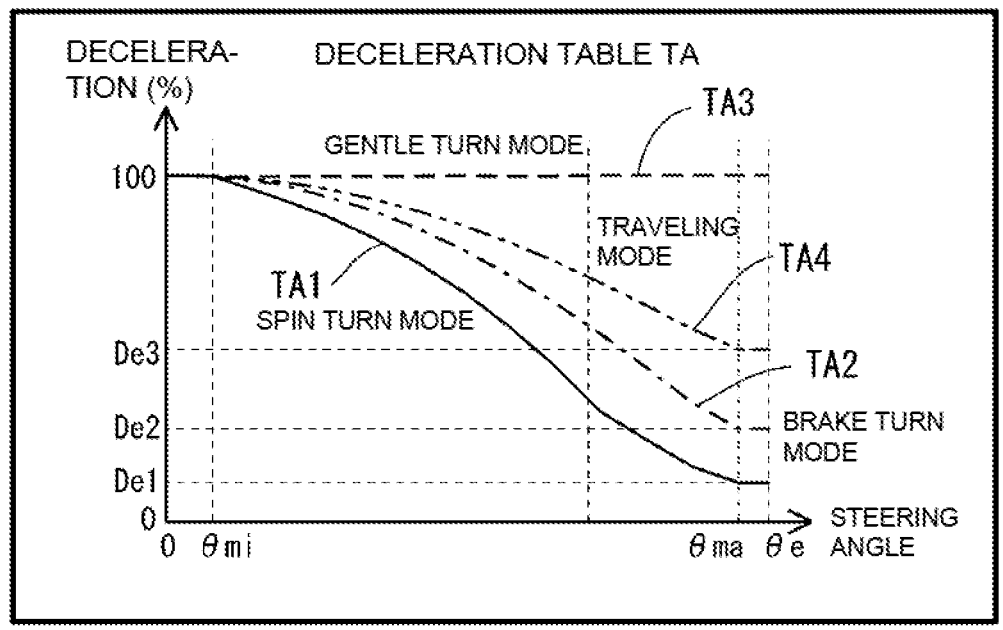
Figure 15:
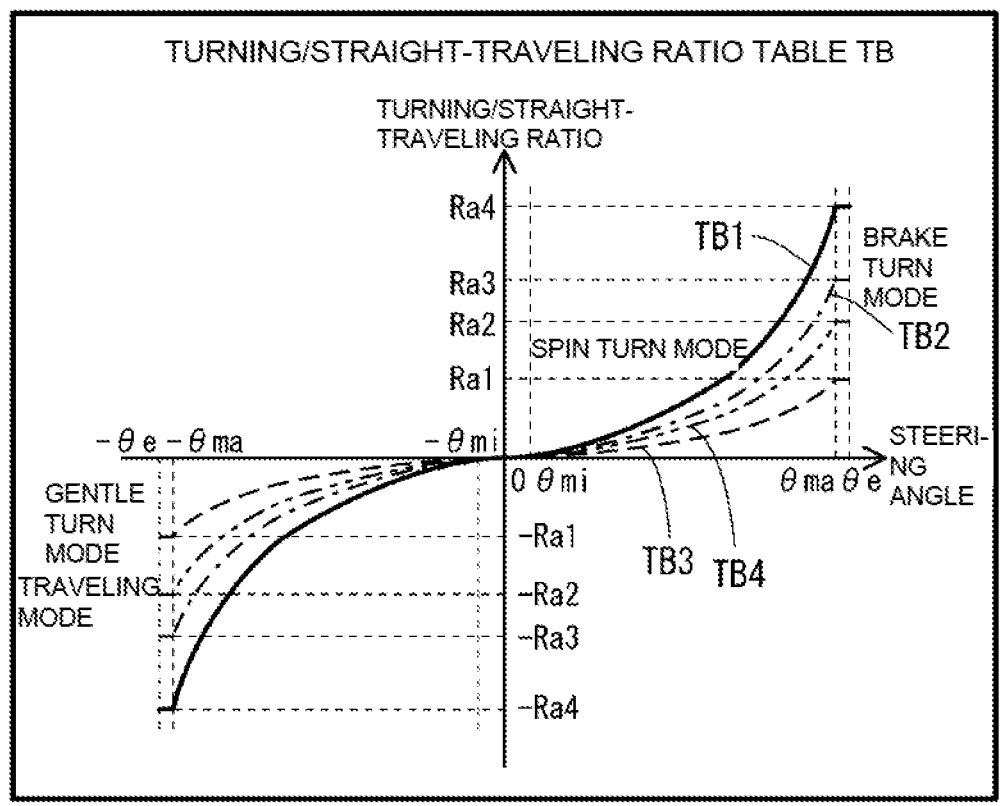

As illustrated in FIG. 14, the straight-traveling controller 813 includes: a straight-traveling computation section 831 for controlling an output of a straight-traveling system transmission path including the hydromechanical stepless transmission (first stepless transmission) 500; a memory 832 for storing a deceleration table TA holding a deceleration of a straight-traveling vehicle speed with respect to a steering angle of the steering wheel 9; and a communication interface 833 connected to the CAN communication bus 815. As illustrated in FIG. 15, the deceleration table TA in the memory 832 stores decelerations TA1 through TA4 of the straight-traveling vehicle speed with respect to the steering angle of the steering wheel 9 in association with four modes of a "spin turn mode (first mode)", a "brake turn mode (second mode)", a "gentle turn mode (third mode)", and a "traveling mode (fourth mode)" described later.

The deceleration table TA in FIG. 15 shows decelerations in a case where the steering wheel 9 is rotated to the right (i.e., the tractor 1 is turned to the right) in the individual modes. The same holds for decelerations in a case where the steering wheel 9 is rotated to the left (i.e., the tractor 1 is turned to the left). That is, in the cases where the steering wheel 9 is rotated to the left and right (i.e., the tractor 1 is turned to the left and right), a deceleration in a specified mode is read from the deceleration table TA based on the steering angle rotated from the neutral position (0°) of the steering wheel 9, and a deceleration of the straight-traveling vehicle speed is determined. The deceleration is a proportion to be multiplied on the straight-traveling speed. When the deceleration is 100%, the straight-traveling speed is not reduced. As the deceleration decreases, the straight-traveling speed is reduced. Rotation of the steering wheel 9 to an angle θe (e.g., 250°) or more with respect to 0° as the neutral position is restricted by the steering angle detection mechanism (steering box) 880.

As illustrated in FIG. 15, in the deceleration table TA, if the steering angle of the steering wheel 9 is θmi (e.g., 15°) relative to 0° (neutral position), this angle is in a neutral range (a so-called play range, and a dead zone) of the steering wheel 9, and the decelerations TA1 through TA4 in the individual modes are 100%. If the steering angle of the steering wheel 9 is from θmi to θma (e.g., 245°), the steering angle is in an operating range of the steering wheel 9, and the decelerations TA1, TA2, and TA4 in the spin turn mode, the brake turn mode, and the traveling mode, respectively, are monotonously reduced in accordance with the steering angle, whereas the deceleration TA3 in the gentle turn mode is made constant at 100%. That is, the steering angle θmi is the neutral position (0°) in control, and the steering angle θma is a maximum steering angle in control. At this time, the rate of change in deceleration with respect to the steering angle increases in the order from the traveling mode, the brake turn mode, and the spin turn mode. When the steering angle of the steering wheel 9 is from θma to θe, the steering angle is a maximum region of the steering wheel 9, and in the spin turn mode, the brake turn mode, and the traveling mode, the decelerations TA1, TA2, and TA4 are minimum values De1 through De3 (0<De1<De2<De3<100) %.

Figure 17:
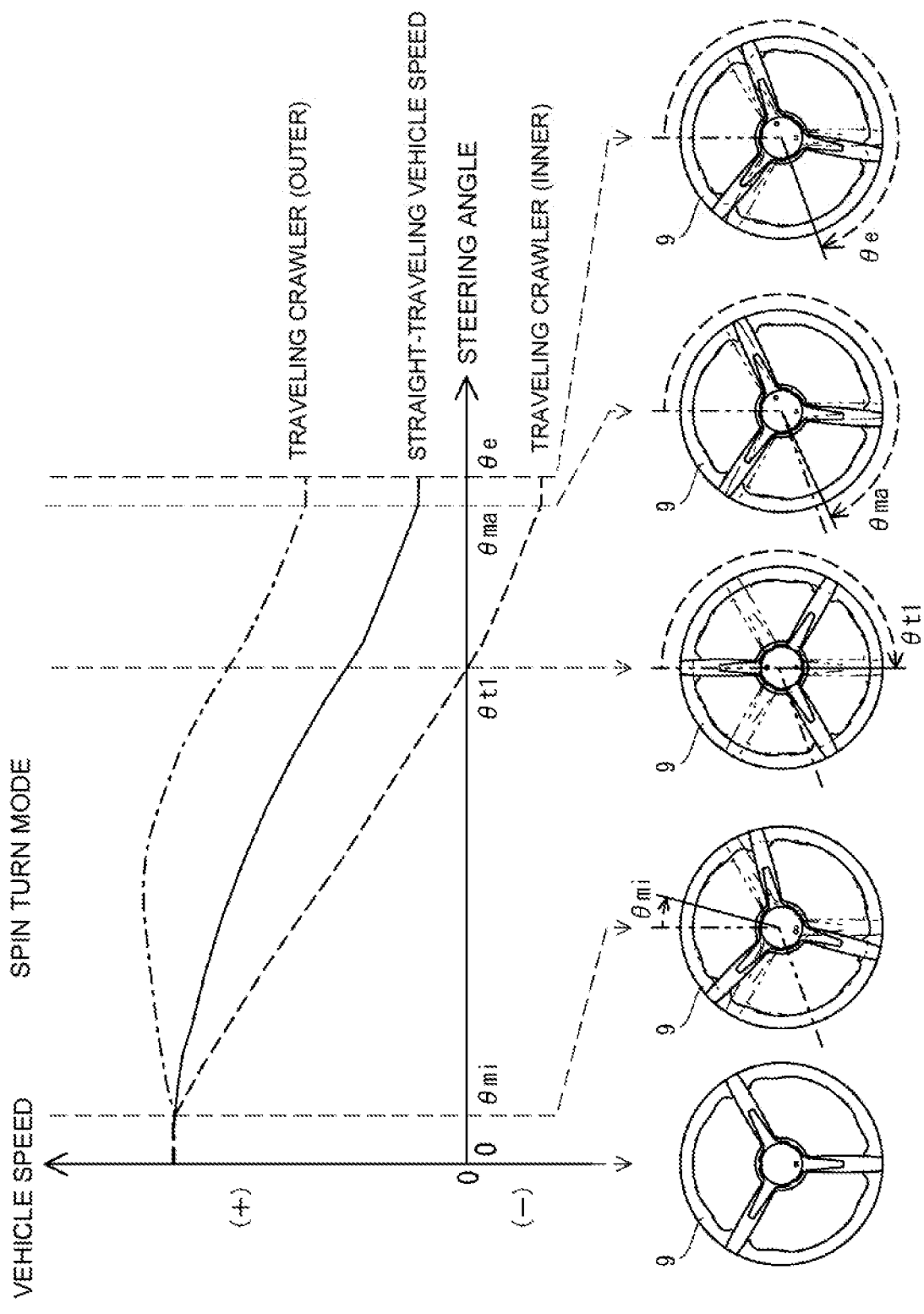

As illustrated in FIG. 14, the turning controller 814 includes: a turning traveling computation section 841 for controlling an output of a turning system transmission path including the hydraulic stepless transmission (second stepless transmission) 701; a memory 842 for storing a turning/straight-traveling ratio table TB (see FIG. 17) holding a turning/straight-traveling ratio of a straight-traveling vehicle speed and a turning vehicle speed with respect to the steering angle of the steering wheel 9; and a communication interface 843 that communicates with the CAN communication bus 815. As illustrated in FIG. 15, the turning/straight-traveling ratio table TB in the memory 842 stores the turning/straight-traveling ratios TB1 through TB4 with respect to the steering angle of the steering wheel 9 for the four modes of the "spin turn mode (first mode)", the "brake turn mode (second mode)", the "gentle turn mode (third mode)", and the "traveling mode (fourth mode)" described later.

The turning/straight-traveling ratio table TB in FIG. 15 shows turning/straight-traveling ratios in a case where the steering wheel 9 is rotated to the right (i.e., the tractor 1 is turned to the right) in the individual modes. The turning/straight-traveling ratio is a ratio to be multiplied on a straight-traveling speed reduced with a deceleration. When the turning/straight-traveling ratio is 0 (zero), the turning speed is zero, and both the left and right traveling crawlers 3 are driven at the same straight-traveling speed. As the turning/straight-traveling ratio increases, the turning speed increases, and thus, the speed difference between the left and right traveling crawlers 3 increases. The following description is mainly directed to a turning/straight-traveling ratio in the case where the steering wheel 9 is rotated to the right (i.e., right turn), and a turning/straight-traveling ratio in a case where the steering wheel 9 is rotated to the left (left turn) is added in parentheses.

As shown in FIG. 15, in the turning/straight-traveling ratio table TB, the turning/straight-traveling ratios TB1 through TB4 in the individual modes are 0 (zero) in the neutral range where the steering angle of the steering wheel 9 is 0° through θmi (−θmi through 0°). In an operating range of the steering wheel 9 where the steering angle of the steering wheel 9 is θmi through θma (−θma through −θmi), the turning/straight-traveling ratios TB1 through TB4 in the spin turn mode, the brake turn mode, the gentle turn mode, and the traveling mode, respectively, are monotonously increased in accordance with the steering angle. At this time, the rate of change in the turning/straight-traveling ratio with respect to the steering angle increases in the order of the gentle turn mode, the traveling mode, the brake turn mode, and the spin turn mode.

In a maximum range where the steering angle of the steering wheel 9 is θma through θe (−θe through −θma), the turning/straight-traveling ratios in the individual modes take maximum values Ra1 through Ra4 (minimum values −Ra1 through −Ra4). As shown in FIG. 15, the maximum turning/straight-traveling ratios Ra1 through Ra4 (−Ra1 through −Ra4) have a relationship 0<Ra1<Ra2<Ra3<Ra4 (−Ra4<−Ra3<−Ra2<−Ra1<0). Suppose the steering angle of the steering wheel 9 is in the maximum range, the maximum turning/straight-traveling ratio is Ra1 (−Ra1) in the gentle turn mode, the maximum turning/straight-traveling ratio is Ra2 (−Ra2) in the traveling mode, the maximum turning/straight-traveling ratio is Ra3 (−Ra3) in the brake turn mode, and the maximum turning/straight-traveling ratio is Ra4 (−Ra4) in the spin turn mode.

Figure 16:
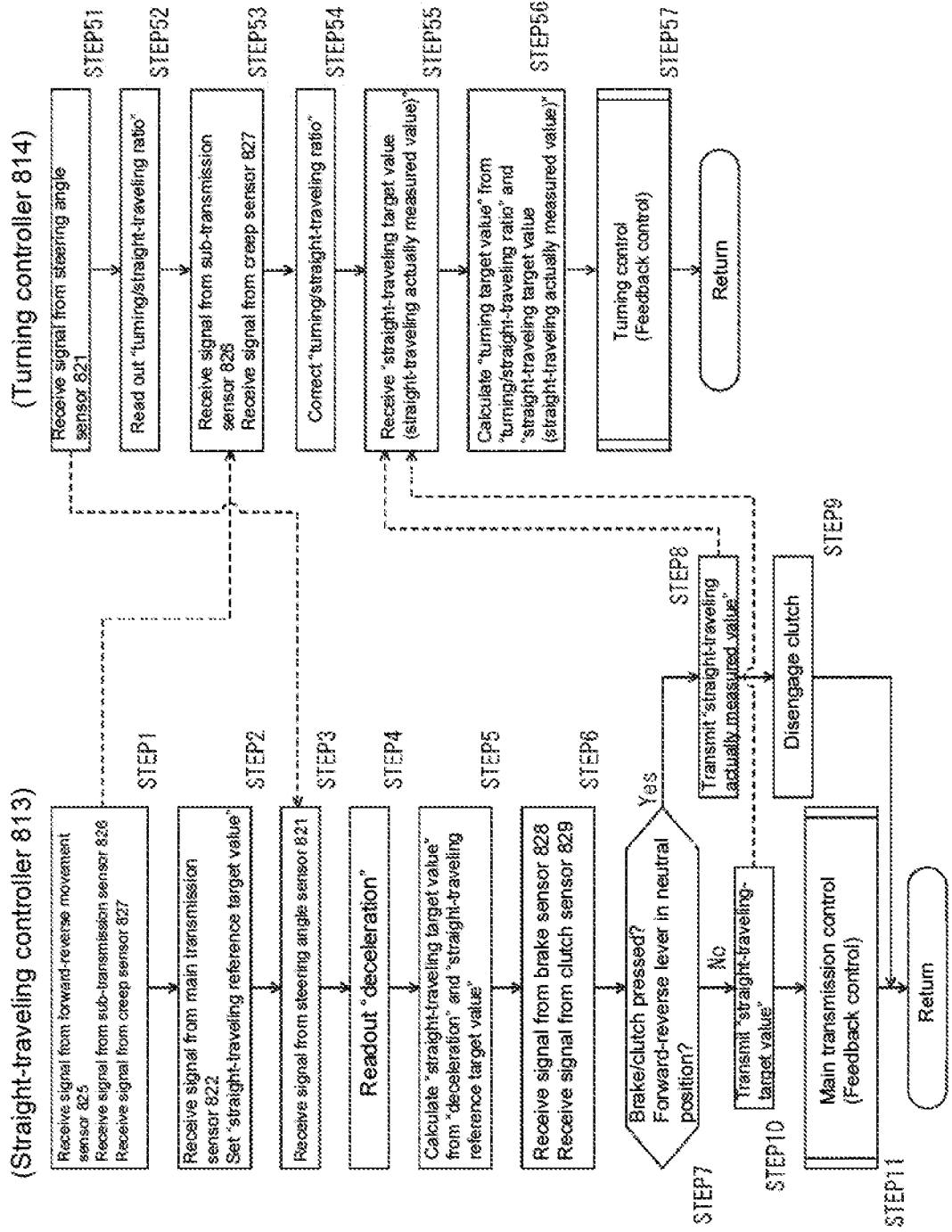

As shown in FIG. 16, in the straight-traveling controller 813, the straight-traveling computation section 831 receives a signal from the forward-reverse movement sensor 825 to recognize which one of "forward", "neutral", and "reverse" is specified, and receives signals from the sub-transmission sensor 826 and the creep sensor 827 to recognize which one of "high-speed", "low-speed", "ultra-low speed", and "neutral" is specified (STEP1). The straight-traveling computation section 831 receives a signal from the main transmission sensor 822 to calculate a target value of a straight-traveling vehicle speed in a straight-traveling state (where the steering angle is 0°) (hereinafter referred to as a "straight-traveling reference target value") (STEP2).

The straight-traveling controller 813 receives a signal from the steering angle sensor 821 with the communication interface 833 through the turning controller 814, and supplies the signal from the steering angle sensor 821 to the straight-traveling computation section 831 (STEP3). When the straight-traveling computation section 831 receives the signal from the steering angle sensor 821 and recognizes the steering angle of the steering wheel 9, the straight-traveling computation section 831 reads the deceleration table TA in the memory 832 and reads a deceleration of the straight-traveling vehicle speed in accordance with the steering angle of the steering wheel 9 in the specified mode (STEP4).

Then, the straight-traveling computation section 831 multiplies the straight-traveling reference target value based on the signal from the main transmission sensor 822 by the readout deceleration, thereby obtaining a target value of the straight-traveling vehicle speed in accordance with the steering angle (hereinafter referred to as a "straight-traveling target value") (STEP5). The "straight-traveling vehicle speed" in each of the straight-traveling reference target value and the straight-traveling target value is a relative speed of the rotation speed of the traveling transmission shaft 536 in the straight-traveling transmission case 17 with respect to the rotation speed of the engine 5.

The straight-traveling computation section 831 receives signals from the brake position sensor 828 and the clutch position sensor 829 to determine whether each of the brake pedal 35 and the clutch pedal 37 is pressed or not (STEP6). Thereafter, the straight-traveling computation section 831 determines whether a vehicle body stopping operation to the brake pedal 35 is performed or not, whether an operation to the clutch pedal 37 is performed or not, and whether the forward-reverse switching lever 36 or the sub-transmission lever 45 is at the neutral position or not (STEP7).

If the vehicle body stopping operation is performed, or if a pressing operation to the clutch pedal 37 is performed, or the forward-reverse switching lever 36 or the sub-transmission lever 45 is at the neutral position (Yes in STEP7), the straight-traveling computation section 831 transmits a signal from the straight-traveling pickup rotation sensor 823 (hereinafter referred to as a "straight-traveling actually measured value") from the communication interface 833 to the turning controller 814 (STEP8). Thereafter, in the case of forward movement, the straight-traveling computation section 831 controls operations of the forward low-speed clutch solenoid valve 632, the forward high-speed clutch solenoid valve 633, and the reverse clutch solenoid valve 634 to disengage the forward low-speed hydraulic clutch 537, the forward high-speed hydraulic clutch 539, and the reverse hydraulic clutch 541 (STEP9).

On the other hand, if no vehicle body stopping operation is performed, a pressing operation is performed on neither the clutch pedal 37 nor the brake pedal 35, the forward-reverse switching lever 36 is at the forward position or the reverse position, and the sub-transmission lever 45 is at any one of an ultra-low-speed position, a low-speed position, and a high-speed position (No in STEP7), the straight-traveling computation section 831 transmits the calculated straight-traveling target value from the communication interface 833 to the turning controller 814 (STEP10). Thereafter, based on the calculated straight-traveling target value, the straight-traveling computation section 831 controls operations of the forward low-speed clutch solenoid valve 632, the forward high-speed clutch solenoid valve 633, and the main transmission hydraulic switching valve 624 in the case of forward movement, whereas the straight-traveling computation section 831 controls operations of the reverse clutch solenoid valve 634 and the main transmission hydraulic switching valve 624 in the case of reverse movement (STEP11). In this manner, all the hydraulic clutches 537, 539, and 541 are in driving-force disconnected states, and a traveling driving force from the main transmission output shaft 512 is substantially zero (in a main clutch disengaged state).

That is, in STEP11, based on the straight-traveling actually measured value (signal from the straight-traveling pickup rotation sensor 823) and the straight-traveling target value, the straight-traveling computation section 831 performs feedback control (main transmission control) on an output of the straight-traveling system transmission path (rotation speed by the straight-traveling output shaft 30). Based on a transmission gear ratio specified based on signals from the sub-transmission sensor 826 and the creep sensor 827, the rotation speed of the traveling transmission shaft 536 is determined from a signal from the straight-traveling pickup rotation sensor 823 and is compared with the straight-traveling target value. In this manner, the output of the straight-traveling system transmission path is controlled.

As depicted in FIG. 16, in the turning controller 814, the turning traveling computation section 841 receives a signal from the steering angle sensor 821 and recognizes the steering angle of the steering wheel 9 (STEP51). The turning traveling computation section 841 refers to the turning/straight-traveling ratio table TB in the memory 842 and reads a turning/straight-traveling ratio in accordance with the steering angle of the steering wheel 9 in the specified mode (STEP52).

The turning controller 814 receives signals from the sub-transmission sensor 826 and the creep sensor 827 with the communication interface 843 through the straight-traveling controller 813, and supplies the signals to the turning traveling computation section 841 (STEP53). Based on the signals from the sub-transmission sensor 826 and the creep sensor 827, the turning traveling computation section 841 recognizes which one of "high-speed", "low-speed", and "ultra-low speed" is specified as a sub-transmission. The turning traveling computation section 841 reads a correction value of the turning/straight-traveling ratio from the memory 842 based on the specified sub-transmission, and based on the specified sub-transmission, the turning traveling computation section 841 corrects the turning/straight-traveling ratio (STEP54).

The turning controller 814 receives the straight-traveling target value calculated by the straight-traveling controller 813 or the straight-traveling actually measured value (signal from the straight-traveling pickup rotation sensor 823) with the communication interface 843, and supplies the received value to the turning traveling computation section 841 (STEP55). The turning traveling computation section 841 obtains a straight-traveling vehicle speed from the straight-traveling target value or the straight-traveling actually measured value, and multiplies the straight-traveling vehicle speed by the corrected turning/straight-traveling ratio, thereby calculating a turning target value as a turning vehicle speed (STEP56). The "turning vehicle speed" in the turning target value is a relative speed of the rotation speed of the motor shaft 709 in the turning transmission case 13 with respect to the rotation speed of the engine 5.

The turning traveling computation section 841 has calculated the turning target value and then controls an operation of the turning hydraulic switching valve 742. At this time, based on the signal from the turning pickup rotation sensor 824 (hereinafter referred to as a "turning actually measured value") and the turning target value, the turning traveling computation section 841 performs feedback control (turning control) of an output of the turning system transmission path (rotation speed by the motor shaft 709) (STEP57).

When the signal from the forward-reverse movement sensor 825 is switched "from forward to reverse" or "from reverse to forward" while main transmission control is being executed, the straight-traveling controller 813 controls the forward low-speed clutch solenoid valve 632 and the reverse hydraulic clutch solenoid valve 634 to switch the forward low-speed hydraulic clutch 537 and the reverse hydraulic clutch 541. As described above, in switching the forward low-speed hydraulic clutch 537 and the reverse hydraulic clutch 541, the straight-traveling controller 813 performs control in such a manner that one of the forward low-speed hydraulic clutch 537 and the reverse hydraulic clutch 541 is constantly engaged.

At this time, the main transmission hydraulic switching valve 624 is controlled by changing the straight-traveling reference target value (or the straight-traveling target value) so that the main transmission output shaft 512 and the traveling relay shaft 535 are in lowest rotation speed states, and then, the numbers of rotations of the main transmission output shaft 512 and the traveling relay shaft 535 are increased to the original numbers of rotations again. Thus, by receiving the straight-traveling target value from the straight-traveling controller 813, the turning controller 814 can change the turning target value in a manner similar to the straight-traveling target value. In this manner, the turning controller 814 can reverse an output of the turning system transmission path (turning vehicle speed) in association with an operation on the steering wheel 9 between forward traveling and reverse traveling of the traveling body 2, thereby providing an operator with smooth operability.

In a case where the main transmission lever 50 is operated to the high-speed side or the low-speed side with a signal from the forward-reverse movement sensor 825 being in the "forward" state while the main transmission control is being executed, the straight-traveling controller 813 controls the forward low-speed clutch solenoid valve 632 and the forward high-speed clutch solenoid valve 633 to switch the forward low-speed hydraulic clutch 537 and the forward high-speed hydraulic clutch 539. As described above, in switching the forward low-speed hydraulic clutch 537 and the forward high-speed hydraulic clutch 539, the straight-traveling controller 813 performs control in such a manner that one of the forward low-speed hydraulic clutch 537 and the forward high-speed hydraulic clutch 539 is constantly engaged.

At this time, the straight-traveling controller 813 controls the main transmission hydraulic switching valve 624 in accordance with the straight-traveling target value. Since the turning controller 814 sets an output of the turning system transmission path (turning vehicle speed) in association with an operation on the steering wheel 9 by receiving the straight-traveling target value from the straight-traveling controller 813, the turning controller 814 can control the output of the turning system transmission path (turning vehicle speed) in accordance with an output of the straight-traveling system transmission path (straight-traveling vehicle speed) without complicated computation, independently of switching of the forward low-speed hydraulic clutch 537 and the forward high-speed hydraulic clutch 539.

In a case where each of the forward low-speed hydraulic clutch 537, the forward high-speed hydraulic clutch 539, and the reverse hydraulic clutch 541 are controlled to be disengaged by pressing the clutch pedal 37, for example, the straight-traveling controller 813 transmits the straight-traveling actually measured value (signal from the straight-traveling pickup rotation sensor 823) to the turning controller 814. Then, the turning controller 814 sets the output of the turning system transmission path (turning vehicle speed) based on the straight-traveling actually measured value (signal from the straight-traveling pickup rotation sensor 823). Thus, even in a case where both the forward high-speed hydraulic clutch 539 and the reverse hydraulic clutch 541 are disengaged and the output of the straight-traveling system transmission path (straight-traveling vehicle speed) does not correspond to the straight-traveling target value, the output of the turning system transmission path (turning vehicle speed) can be optimized, and thus, the operator can operate the vehicle without incongruity.

When the brake pedal 35 is pressed and a vehicle body stopping operation by, for example, a hard braking operation, the straight-traveling controller 813 controls the forward low-speed hydraulic clutch 537, the forward high-speed hydraulic clutch 539, and the traveling hydraulic clutch 541 so that these clutches are disengaged in a high-speed range where the traveling speed (straight-traveling vehicle speed) is a predetermined speed or more, whereas the straight-traveling controller 813 controls the forward low-speed hydraulic clutch 537 or the reverse hydraulic clutch 541 so that the clutch 537 or 541 is engaged in accordance with forward-reverse movement of the vehicle in a low-speed range where the traveling speed (straight-traveling vehicle speed) is less than the predetermined speed. At this time, the turning controller 814 sets the output of the turning system transmission path (turning vehicle speed) based on the straight-traveling actually measured value (signal from the straight-traveling pickup rotation sensor 823). Thus, even in a case where the output of the straight-traveling system transmission path (straight-traveling vehicle speed) does not correspond to the straight-traveling target value while brake control by an operation on the brake pedal 35 is being executed, the output of the turning system transmission path (turning vehicle speed) can be decelerated in accordance with the output of the straight-traveling system transmission path (straight-traveling vehicle speed), and thus, the operator can operate the vehicle without incongruity.

On the other hand, even in a state where the vehicle body stopping operation to the brake pedal 35 is performed, in a low-speed range where the traveling speed (straight-traveling vehicle speed) is less than the predetermined speed, the straight-traveling controller 813 sets a straight-traveling target value so that the pump swash plate 523 of the hydromechanical stepless transmission 500 is in the neutral state (0°) while engaging the forward low-speed hydraulic clutch 537 or the reverse hydraulic clutch 541 in accordance with forward-reverse movement of the vehicle, and executes main transmission control (feedback control). At this time, the turning controller 814 may set an output of the turning system transmission path (turning vehicle speed) based on the straight-traveling actually measured value or may set an output of the turning system transmission path based on the straight-traveling target value.

The turning controller 814 decelerates the output of the turning system transmission path (turning vehicle speed) in accordance with the deceleration of the output of the straight-traveling system transmission path (straight-traveling vehicle speed). Then, when the steering wheel 9 is operated, the turning controller 814 accelerates the output of the turning system transmission path (turning vehicle speed), and the turning controller 814 decelerates the output of the straight-traveling system transmission path (straight-traveling vehicle speed) so that a speed ratio of the left and right traveling crawlers 3 in turning can be determined based on the steering wheel angle (steering angle) of the steering wheel 9.

The operator can select, by operating the operating monitor 55, the "spin turn mode (first mode)" in which the inside in turning is reversed to enable a sharp turn (spin turn) in the case of a large steering wheel angle, the "brake turn mode (second mode)" in which the turn is less sharp than that in the spin turn mode and, when the steering wheel angle approaches its maximum, a brake turn of stopping the inside in turning can be executed, the "gentle turn mode (third mode)" in which the wheel steering angle is much smaller than that in the brake turn mode, and the "traveling mode (fourth mode)" compatible with high vehicle speeds. In a case where an ultra-low speed traveling or a low speed traveling is specified by the ultra-low speed lever 44 and the sub-transmission lever 45, a turning operation by any one of the "spin turn mode", the "brake turn mode", and the "gentle turn mode" is permitted. On the other hand, in a case where a high speed traveling is specified by the ultra-low speed lever 44, only a turning operation by the "traveling mode" is permitted.

In addition, the operator can adjust a turning force for turning in a plurality of stages by operating the operating monitor 55. Thus, by operating the operating monitor 55, the operator can select one of the plurality of modes and also can adjust the turning force stepwise. As a result, the operator can easily select traveling characteristics (turning characteristics) appropriate for, for example, field conditions.

Figure 18:
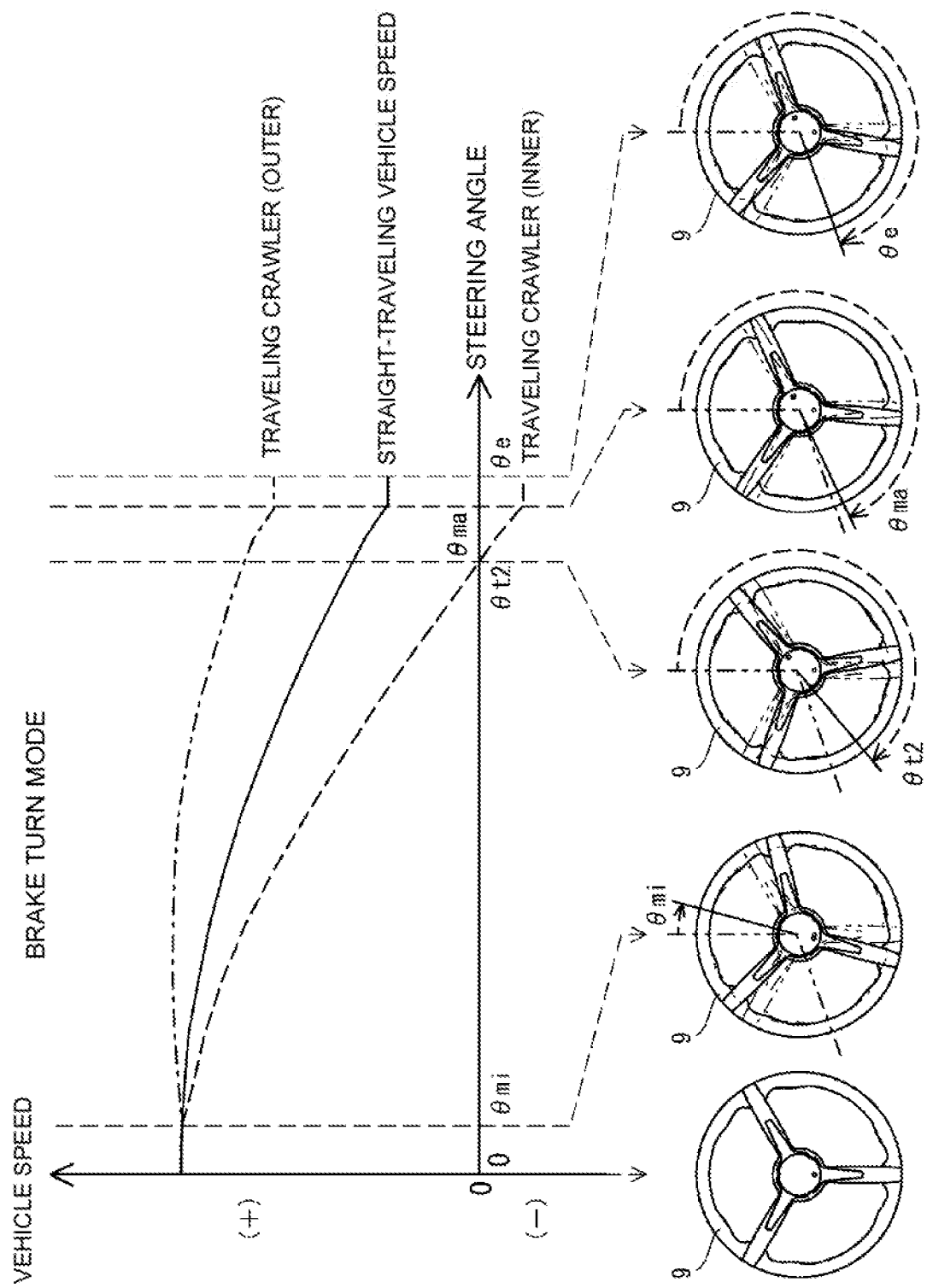

In the case of specifying the "spin turn mode", as illustrated in FIG. 18, when the steering wheel angle of the steering wheel 9 is at an angle θt1 (where θmi<θt1<θma), the inner traveling crawler 3 is stopped and the traveling body 2 is turned by a brake turn. When the steering wheel angle of the steering wheel 9 exceeds the angle θt1, the inner traveling crawler 3 is reversely rotated so that the traveling body 2 is turned by a spin turn. That is, in a case where the steering wheel angle of the steering wheel 9 is less than the angle θt1, the inner traveling crawler 3 is decelerated. In a case where the steering wheel angle of the steering wheel 9 is at the angle θt1, the inner traveling crawler 3 is stopped, whereas in a case where the steering wheel angle of the steering wheel 9 exceeds the angle θt1, the inner traveling crawler 3 is reversely rotated. In this manner, the turning center and the turning radius of the traveling body 2 can be changed in accordance with the amount of operation to the steering wheel 9. Accordingly, the traveling body 2 can be turned in a state close to an operation sense to the steering wheel 9. As a result, the traveling body 2 can travel with stability.

Figure 19:
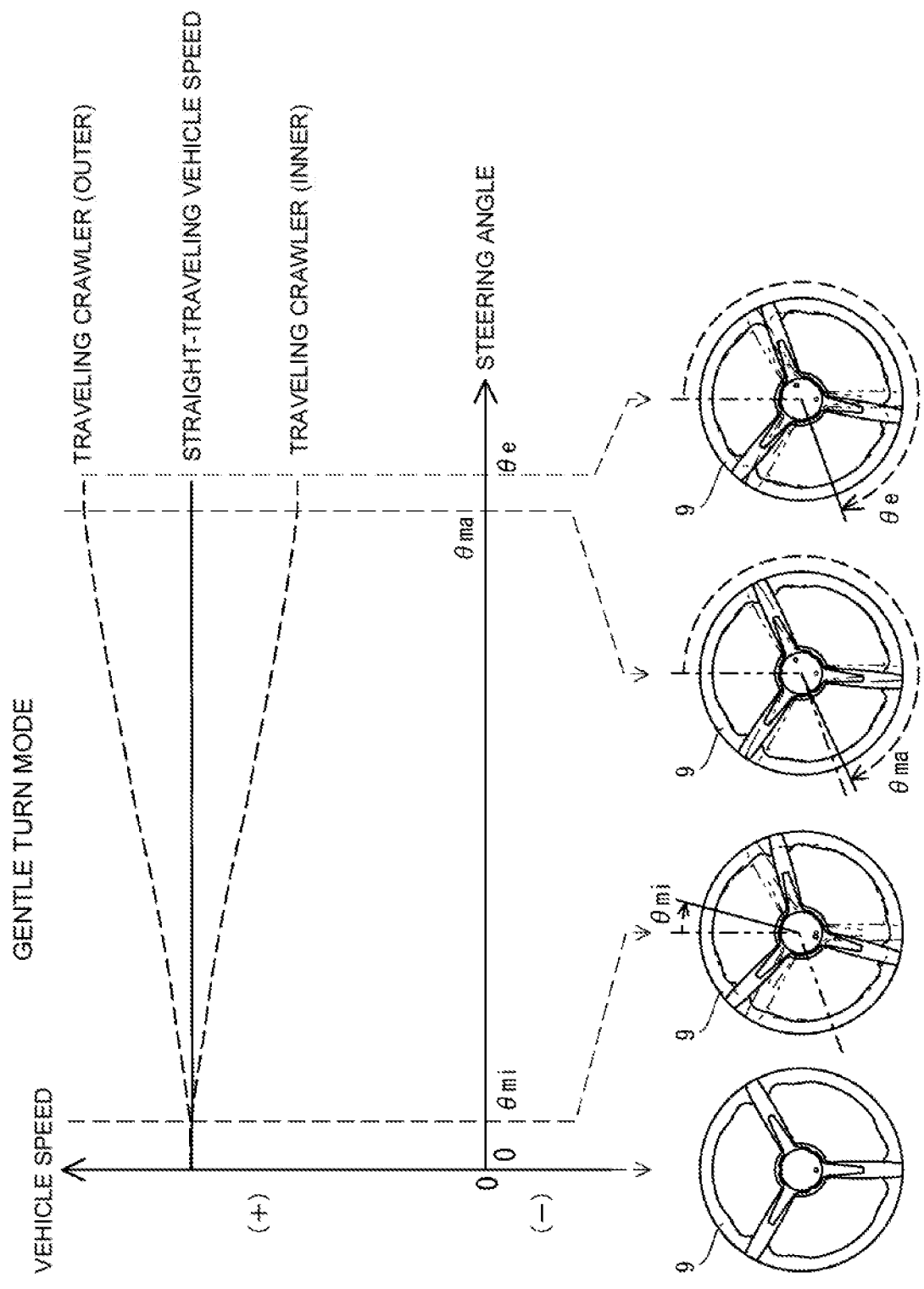

In the case of specifying the "brake turn mode", as illustrated in FIG. 19, when the steering wheel angle of the steering wheel 9 is at an angle θt2 (where θt1<θt2<θma) close to the maximum angle θma in control, the traveling body 2 is turned by a brake turn. In the case of specifying the "gentle turn mode", as illustrated in FIG. 19, even when the steering wheel angle of the steering wheel 9 is increased to the maximum angle θma in control or more, the inner traveling crawler 3 is not stopped, and the traveling body 2 is gently turned. In the "traveling mode", no turning operation by any of a brake turn and a spin turn is not performed.

In calculating the turning target value at STEP56, if a driving force blocking mechanism in the straight-traveling transmission case 17 (a straight-traveling system transmission path) blocks an output from the hydromechanical stepless transmission 500, the turning controller 814 inhibits a reverse rotation operation by the inner traveling crawler 3. Accordingly, when driving force transfer is blocked in the straight-traveling transmission case 17, a reverse driving force to be output from the turning transmission case 13 to the traveling crawlers 3 can be restricted so that consecutive pivot turns of the traveling body 2 can be prevented. An operation of setting the turning target value by the turning controller 814 (operation at STEP56 in FIG. 16) will be described below with reference to the flowchart of FIG. 20.

Figure 20:
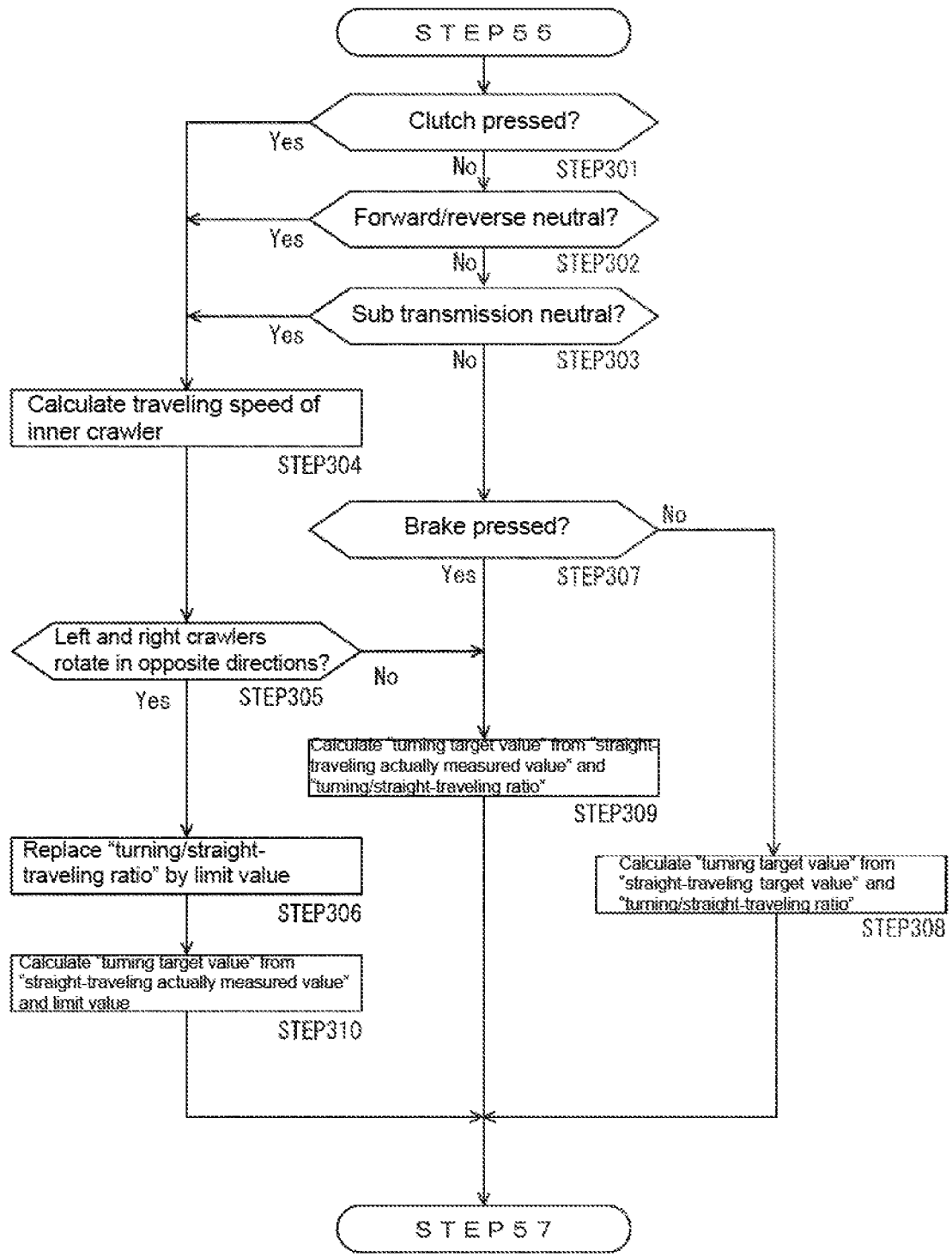

As illustrated in FIG. 20, when receiving a signal from the straight-traveling controller 813 at STEP55, the turning controller 814 determines whether an operation is performed on the clutch pedal 37 or not and whether the forward/reverse switching lever 36 or the sub-transmission lever 45 is at the neutral position or not (STEP301 through STEP303). If the clutch pedal 37 is pressed (Yes in STEP301), if the forward/reverse switching lever 36 is at the neutral position (Yes in STEP302), or if the sub-transmission lever 45 is at the neutral position (Yes in STEP303), the turning controller 814 calculates a progress speed Vin of the inner traveling crawler 3 using the straight-traveling actually measured value and the turning/straight-traveling ratio (STEP304).

Then, if the obtained progress speed Vin of the inner traveling crawler 3 is in the opposite direction (traveling direction of the traveling body 2) opposite to that of the straight-traveling vehicle speed based on the straight-traveling actually measured value (Yes in STEP305), the turning controller 814 replaces the turning/straight-traveling ratio by a limit value ±Ralim (STEP306). The limit value ±Ralim of the turning/straight-traveling ratio is set at a value smaller than one, and the absolute value of the turning target value (turning speed) is set to be smaller than the absolute value of the straight-traveling actually measured value (straight-traveling value). On the other hand, if the clutch pedal 37 is not pressed and none of the forward/reverse switching lever 36 and the sub-transmission lever 45 is at the neutral position (No in each of STEP301 through STEP303), the turning controller 814 determines whether an operation is performed on the brake pedal 35 or not (STEP307).

If no operation is performed on the brake pedal 35 (No in STEP307), the turning controller 814 multiplies the straight-traveling vehicle speed from the straight-traveling target value by the turning/straight-traveling ratio corrected at STEP54, thereby calculating a turning target value serving as a turning vehicle speed (STEP308). If the progress speeds of the left and right traveling crawlers 3 are in the same direction as that of the straight-traveling speed (No in STEP305) or if an operation is performed on the brake pedal 35 (Yes in STEP307), the turning controller 814 multiplies the straight-traveling vehicle speed from the straight-traveling by the turning/straight-traveling ratio corrected at STEP54, thereby calculating a turning target value serving as a turning vehicle speed (STEP309). In addition, if the progress speeds of the left and right traveling crawlers 3 become opposite to each other (Yes in STEP305) and the turning controller 814 sets the turning/straight-traveling ratio at the limit value (STEP306), the turning controller 814 multiplies the straight-traveling vehicle speed from the straight-traveling actually measured value by the turning/straight-traveling ratio serving as the limit value, thereby calculating a turning target value serving as a turning vehicle speed (STEP310).

In this embodiment, the hydraulic clutches 537, 539, and 541 as driving force blocking mechanisms or the sub transmission shifter 557 in the straight-traveling transmission case 17 (the straight-traveling system transmission path) is disengaged so that driving force transfer from the hydromechanical stepless transmission 500 to the straight-traveling output shaft 30 is blocked. In this manner, in the case where driving force transfer from the hydromechanical stepless transmission 500 to the straight-traveling output shaft 30 is blocked, the turning controller 814 restricts the turning/straight-traveling ratio using the limit value so that opposite rotation operations of the left and right traveling crawlers 3 can be inhibited. Accordingly, while the straight-traveling output shaft 30 rotates by inertia, a differential output from the turning transmission case 13 can be restricted. Thus, even in a case where the steering angle of the steering wheel 9 is large in a brake turn mode or a spin turn mode, the turning radius of the traveling body 2 is set large (i.e., the turning curvature is set small) so that consecutive pivot turns of the traveling body 2 can be prevented.

In this manner, in the case where driving force transfer from the hydromechanical stepless transmission 500 to the straight-traveling output shaft 30 is blocked, the turning/straight-traveling ratio is restricted using the limit value only when the left and right traveling crawlers 3 rotate in opposite directions. That is, in a case where the left and right traveling crawlers 3 rotate in opposite directions and are subjected to frictional forces in opposite directions from the ground, the turning/straight-traveling ratio is restricted using the limit value. In addition, in performing a braking operation by the brake mechanism 751, the turning/straight-traveling ratio is not restricted, and a turning target value is calculated based on the straight-traveling actually measured value. Thus, the turning target value to the turning transmission case 13 can be constantly set to be optimum for a traveling state of the traveling body 2. Accordingly, in a case where no braking action is exerted on the output side (the straight-traveling output shaft 30) of the straight-traveling system transmission path, consecutive pivot turns of the traveling body 2 can be prevented, and a braking action due to a reaction force such as a frictional force from the ground is exerted on the traveling crawlers 3. Accordingly, safety traveling can be achieved.

Figure 21:
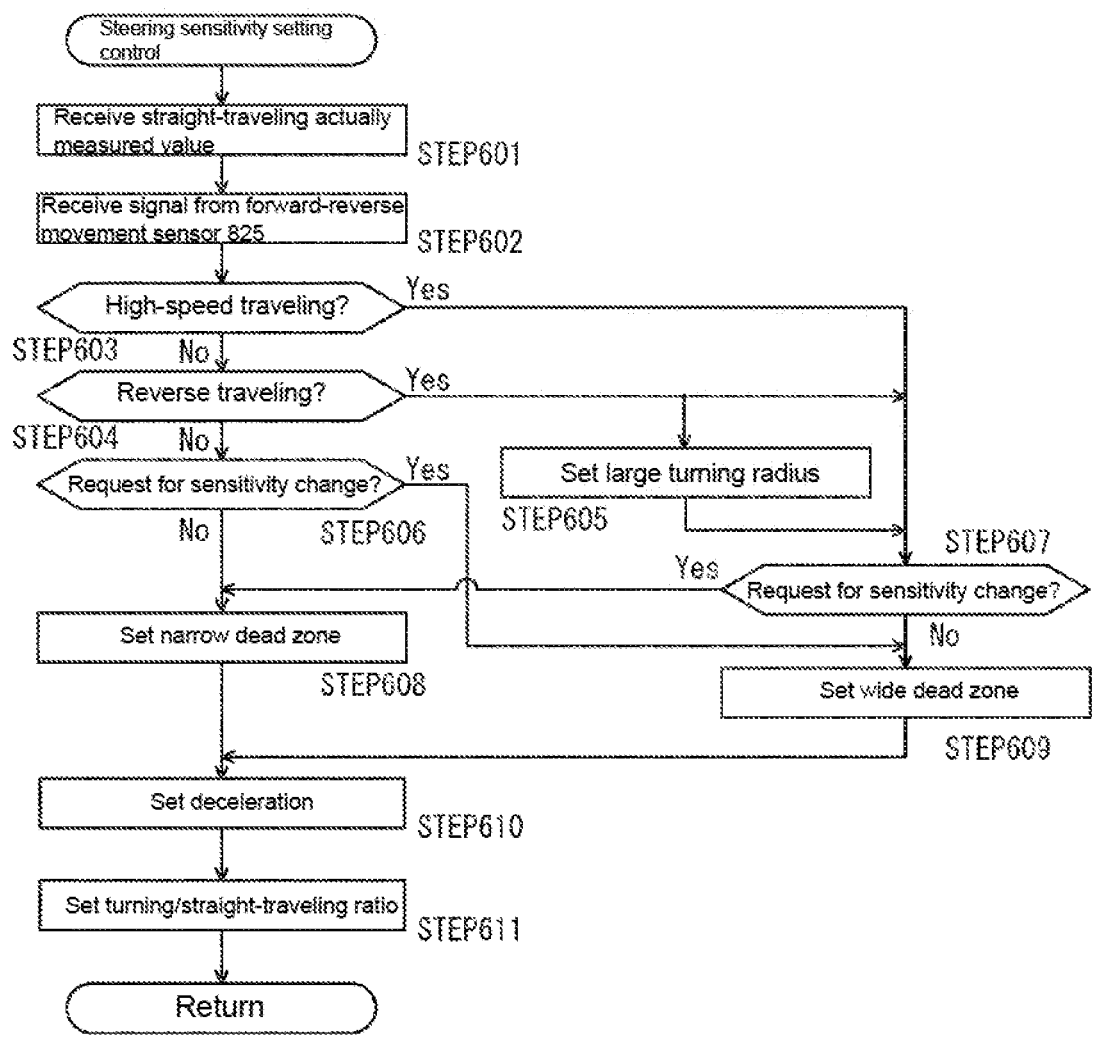
Figure 22:
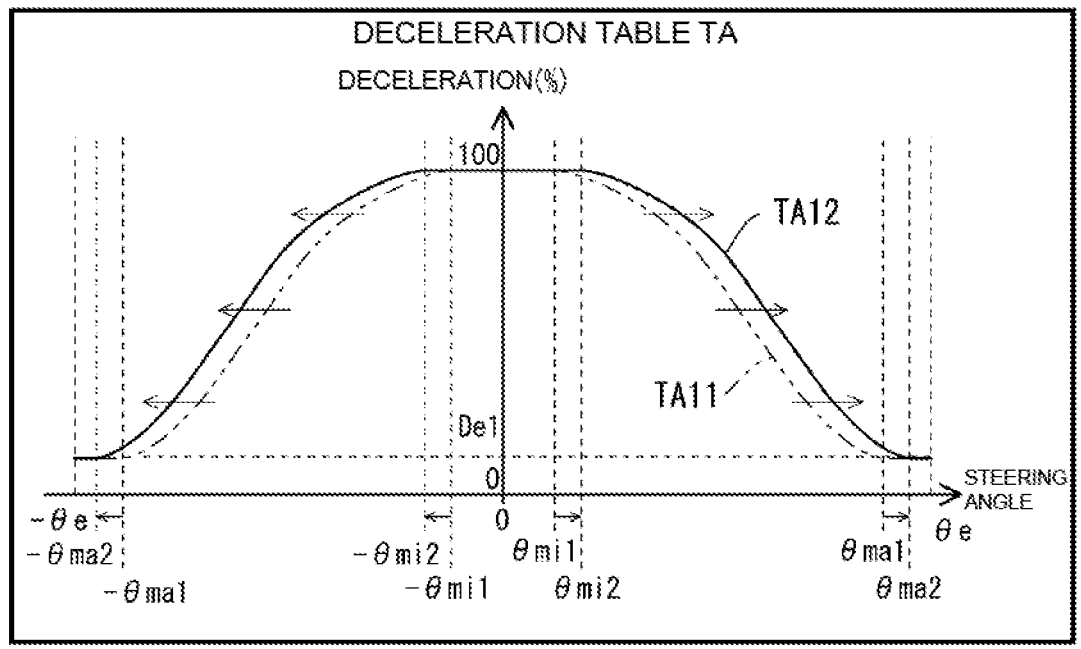
Figure 22:
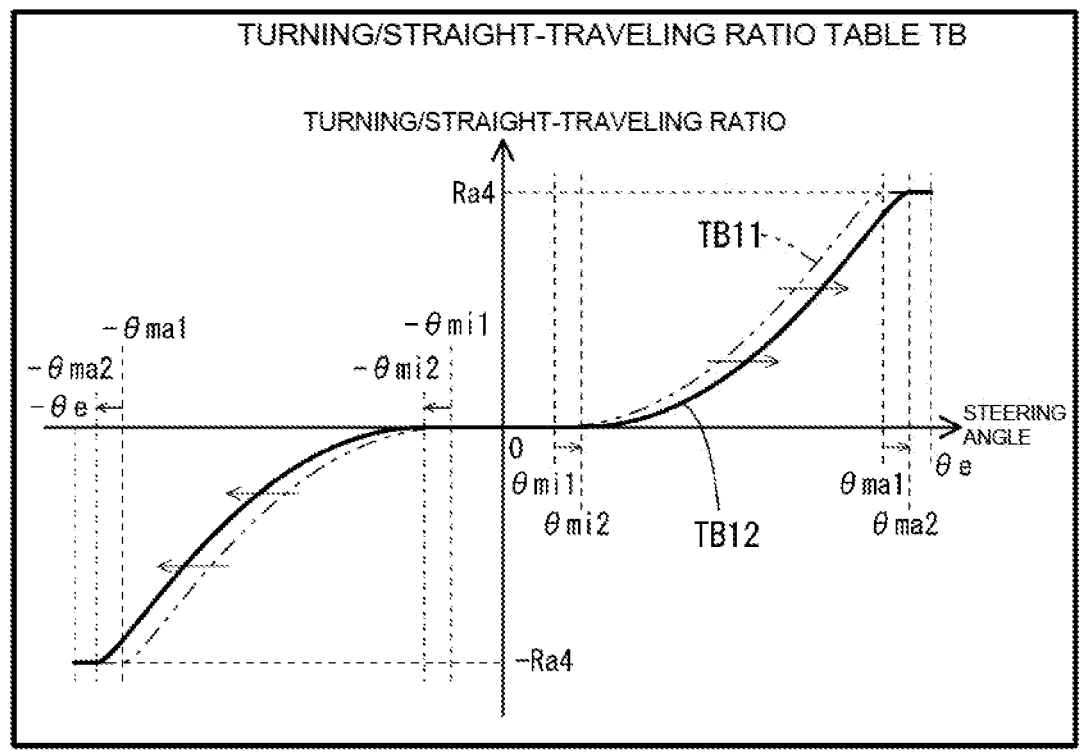

The turning controller 814 sets a deceleration at 100% and stores a plurality of dead zone ranges in the memory 842 so that the dead zone range (neutral range) $-\theta$mi to $\theta$mi of the steering wheel 9 where the turning/straight-traveling ratio is zero is changeable. Steering sensitivity setting control by switching the dead zone range by the turning controller 814 will now be described with reference to FIGS. 21 and 22, for example. FIG. 21 is a flowchart depicting an operation of steering sensitivity setting control. FIG. 22 is a flowchart depicting a relationship between a deceleration and a turning/straight-traveling ratio set based on a change in the dead zone range.

In this embodiment, as the dead zone range (neutral range) stored in the memory 842, two dead zone ranges: a narrow dead zone range $-\theta$mi1 to $\theta$mi1 and a wide dead zone range $-\theta$mi2 to $\theta$mi2 are stored, but three or more dead zone ranges may be stored. The dead zone range stored in the memory 842 can be changed to a value intended by an operator by an operator's operation of the operating monitor 55. Accordingly, a plurality of dead zone ranges optimum for the traveling state of the traveling body 2 and surface states of, for example, a field or a road can be stored in the memory 842 and, in addition, an optimum steering operation for a driving operation of each operator can be performed.

As illustrated in FIG. 21, the turning controller 814 receives a signal (straight-traveling actually measured value) from the straight-traveling pickup rotation sensor 823 to determine a straight-traveling vehicle speed (STEP601), and receives a signal from the forward-reverse movement sensor 825 to determine a traveling direction (forward or reverse) of the traveling body 2 (STEP602). Then, if the straight-traveling vehicle speed of the traveling body 2 is less than a predetermined speed, the traveling body 2 is traveling at low speed (No in STEP603), the traveling body 2 is traveling in forward (No in STEP604), and no request for changing sensitivity is issued by an operation of, for example, the operating monitor 55 (No in STEP606), then the turning controller 814 sets the narrow dead zone range $-\theta$mi1 to $\theta$mi1 (STEP608).

On the other hand, if the straight-traveling vehicle speed of the traveling body 2 is the predetermined speed or more, the traveling body 2 is traveling at high speed (Yes in STEP603), and no request of changing sensitivity is issued by an operation of, for example, the operating monitor 55 (No in STEP609), then the turning controller 814 sets the wide dead zone range $-\theta mi2$ to $\theta mi2$ (STEP609). If the traveling body 2 is traveling in reverse (Yes in STEP603), the turning controller 814 first makes a setting of increasing the turning radius (STEP605), and subsequently, if no request for changing sensitivity is issued by, for example, an operation of the operating monitor 55 (No in STEP609), the turning controller 814 sets the wide dead zone range $-\theta mi2$ to $\theta mi2$ (STEP609).

If a request for changing sensitivity is issued in STEP606 (Yes), the turning controller 814 sets the wide dead zone range $-\theta mi2$ to $\theta mi2$ (STEP609), whereas if a request for changing sensitivity is issued in STEP607 (Yes), the turning controller 814 sets the narrow dead zone range $-\theta mi1$ to $\theta mi1$ (STEP608). The request for changing sensitivity is not limited to an operation during driving, and may be such a request that is input by an operator with the operating monitor 55 or the like in accordance with the state of a field or a road surface and the type of work, and is previously stored in the turning controller 814 by means of flags in the memory 832, while the traveling body 2 is stopped.

When the turning controller 814 sets the dead zone range (STEP608 or STEP609), the turning controller 814 refers to the deceleration table TA and the turning/straight-traveling ratio table TB in the memory 832, and in accordance with the dead zone range after setting, sets a deceleration and a turning/straight-traveling ratio in accordance with a currently specified mode (STEP610 through STEP611).

In this present embodiment, as illustrated in FIG. 22, in a case where a spin turn mode is selected, for example, if the narrow dead zone range $-\theta mi1$ to $\theta mi1$ is set, the deceleration table TA11 is set such that the deceleration is at a minimum value De1 for the steering angle $\theta ma1$ ($-\theta ma1$), whereas the turning/straight-traveling ratio table TB12 is set such that the turning/straight-traveling ratio is at a maximum value Ra4 for the steering angle $\theta ma1$ ($-\theta ma1$). On the other hand, if the wide dead zone range $-\theta mi2$ to $\theta mi2$ is set, the deceleration table TA12 is set such that the deceleration is set at the minimum value De1 for the steering angle $\theta ma2$ ($-\theta ma2$), whereas the turning/straight-traveling ratio table TB12 is set such that the turning/straight-traveling ratio is at the maximum value Ra4 for the steering angle $\theta ma2$ ($-\theta ma2$). The $\theta mi1$, $\theta mi2$, $\theta ma1$, and $\theta ma2$ show a relationship of $0<\theta mi1<\theta mi2<\theta ma1<\theta ma2<\theta e$.

That is, the deceleration table TA12 of the wide dead zone range $-\theta mi2$ to $\theta mi2$ is off set (moves in parallel) in a positive direction by $\theta mi2-\theta mi1$ for a forward rotation side (where the steering angle is a positive value and a right turning), and in a negative direction by $\theta mi2-\theta mi1$ for a reverse rotation side (where the steering angle is a negative value and a left turning), with respect to the deceleration table TA11 of the narrow dead zone range $-\theta mi1$ to $\theta mi1$. The turning/straight-traveling ratio table TB12 of the wide dead zone range $-\theta mi2$ to $\theta mi2$ is also off set (moves in parallel) in the positive direction by $\theta mi2-\theta mi1$ for the forward rotation side (where the steering angle is a positive angle and right turning), and in the negative direction by $\theta mi2-\theta mi1$ for the reverse rotation side (the steering angle is a negative value and a left turning), with respect to the turning/straight-traveling ratio table TB11 of the narrow dead zone range $-\theta mi1$ to $\theta mi1$.

By performing the steering sensitivity setting control described above, the dead zone range for rotation of the steering wheel 9 can be changed in accordance with the traveling state, and thus, even when a wheel operation is affected by the posture and vibrations, for example, of the traveling body 2, an unintentional turning operation can be prevented so that operability can be enhanced. In addition, steering or transmission control suitable for traveling road (field) conditions or a traveling feeling desired by the operator can be easily obtained, and thus, enhancement of driving operability, for example, can be easily achieved.

In addition, by performing the steering sensitivity setting control described above, a wide dead zone range can be set during high-speed traveling and reverse traveling. Thus, a turning operation unintended by the operator can be prevented so that an accident due to an unintentional turning during high-speed traveling or reverse traveling can be avoided as well as enhancement of operability. Furthermore, since the turning radius in reverse traveling and the turning radius in forward traveling are changeable, operability can also be enhanced in reverse traveling in which a driving operation is difficult because the operator faces rearward.

In this embodiment, as illustrated in FIG. 22, when the steering angle of the steering wheel 9 at which deceleration of straight-traveling (an output of the straight-traveling system transmission path) of the traveling body 2 starts (hereinafter referred to as a "straight-traveling deceleration start steering angle") and a steering angle of the steering wheel 9 at which acceleration of the turning vehicle speed (an output of a turning system transmission) of the traveling body 2 starts (hereinafter referred to as a "turning acceleration start steering angle") are set at $\theta mi1$, the dead zone range of the steering wheel 9 is thereby reduced. On the other hand, when the straight-traveling deceleration start steering angle and the turning acceleration start steering angle in the steering wheel 9 are set at $\theta mi2$, the dead zone range of the steering wheel 9 is thereby increased.

(Second Example of Setting Operation of Turning Target Value)

As described above, regarding a setting operation of the turning target value by the turning controller 814, the example operation depicted by the flowchart of FIG. 20 has been described as the first example of this embodiment, but another example operation except for the first example may be employed. A second example of the setting operation of the turning target value by the turning controller 814 will be described with reference to the flowchart of FIG. 23. In operation steps in the flowchart of FIG. 23, operation steps also used in the flowchart of FIG. 20 are denoted by the same reference numerals, and detailed description thereof will be omitted.

Figure 23:
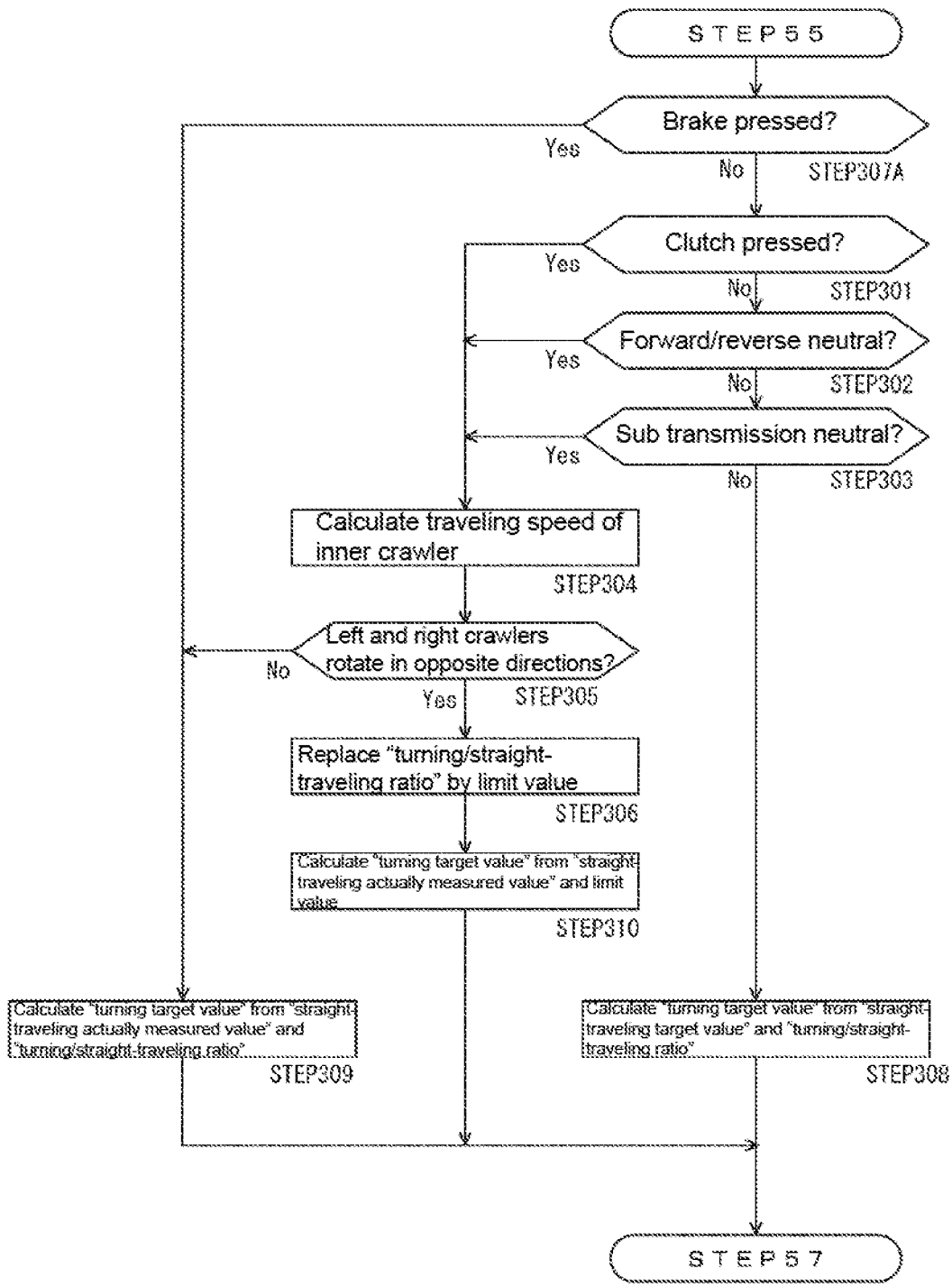

As shown in FIG. 23, when receiving a signal from the straight-traveling controller 813 in STEP55, the turning controller 814 determines whether an operation is performed on the brake pedal 35 or not (STEP307A). If no pressing is performed on the brake pedal 35 (No in STEP307A), the turning controller 814 determines whether an operation is performed on the clutch pedal 37 or not and determines operation positions of the forward/reverse switching lever 36 and the sub-transmission lever 45 (STEP301 through STEP303). On the other hand, if pressing on the brake pedal 35 is detected (Yes in STEP307A), a turning target value is calculated from the straight-traveling actually measured value and the turning/straight-traveling ratio (STEP309).

If no operation is performed on the brake pedal 35 and driving force transfer from the hydromechanical stepless transmission 500 to the straight-traveling output shaft 30 is blocked (Yes in any one of STEP301 through STEP303), when the turning controller 814 determines that the left and right traveling crawlers 3 rotate in opposite directions (Yes in STEP304 and STEP305), the turning/straight-traveling ratio is replaced by a limit value, and a turning target value is calculated from the straight-traveling actually measured value (STEP306 and STEP310). On the other hand, if the turning controller 814 determines that the left and right traveling crawlers 3 rotate in the same direction (No in STEP304 and STEP305), a turning target value is calculated from a straight-traveling actually measured value and a turning/straight-traveling ratio (STEP309). If the sub transmission shifter 557 is coupled to one of the hydraulic clutches 537, 539, and 541 (No in each of STEP301 through STEP303), a turning target value is calculated from the straight-traveling target value and the turning/straight-traveling ratio (STEP308).

In this example, if an operation is performed on the brake pedal 35, irrespective of whether driving force transfer from the hydromechanical stepless transmission 500 to the straight-traveling output shaft 30 is blocked or not, a turning target value is set from the straight-traveling actually measured value and the turning/straight-traveling ratio. That is, if a braking action is exerted on the straight-traveling output shaft 30, the turning target value is set based on the straight-traveling actually measured value corresponding to the number of rotations of the straight-traveling output shaft 30. Thus, the turning speed decreases in accordance with a deceleration of the straight-traveling speed by the braking action so that consecutive pivot turns of the traveling body 2 can be avoided. On the other hand, in a case where there is a possibility of a pivot turn of the traveling body 2 while the straight-traveling output shaft 30 rotates by inertia, the pivot turn can be inhibited by restricting the turning/straight-traveling ratio. Thus, a behavior unexpected by the operator can be prevented so that driving safety can be enhanced.

(Third Example of Setting Operation of Turning Target Value)

A third example of the setting operation of the turning target value by the turning controller 814 will be described with reference to the flowchart of FIG. 24. In operation steps in the flowchart of FIG. 24, operation steps also used in the flowchart of FIG. 20 are denoted by the same reference numerals, and detailed description thereof will be omitted.

Figure 24:
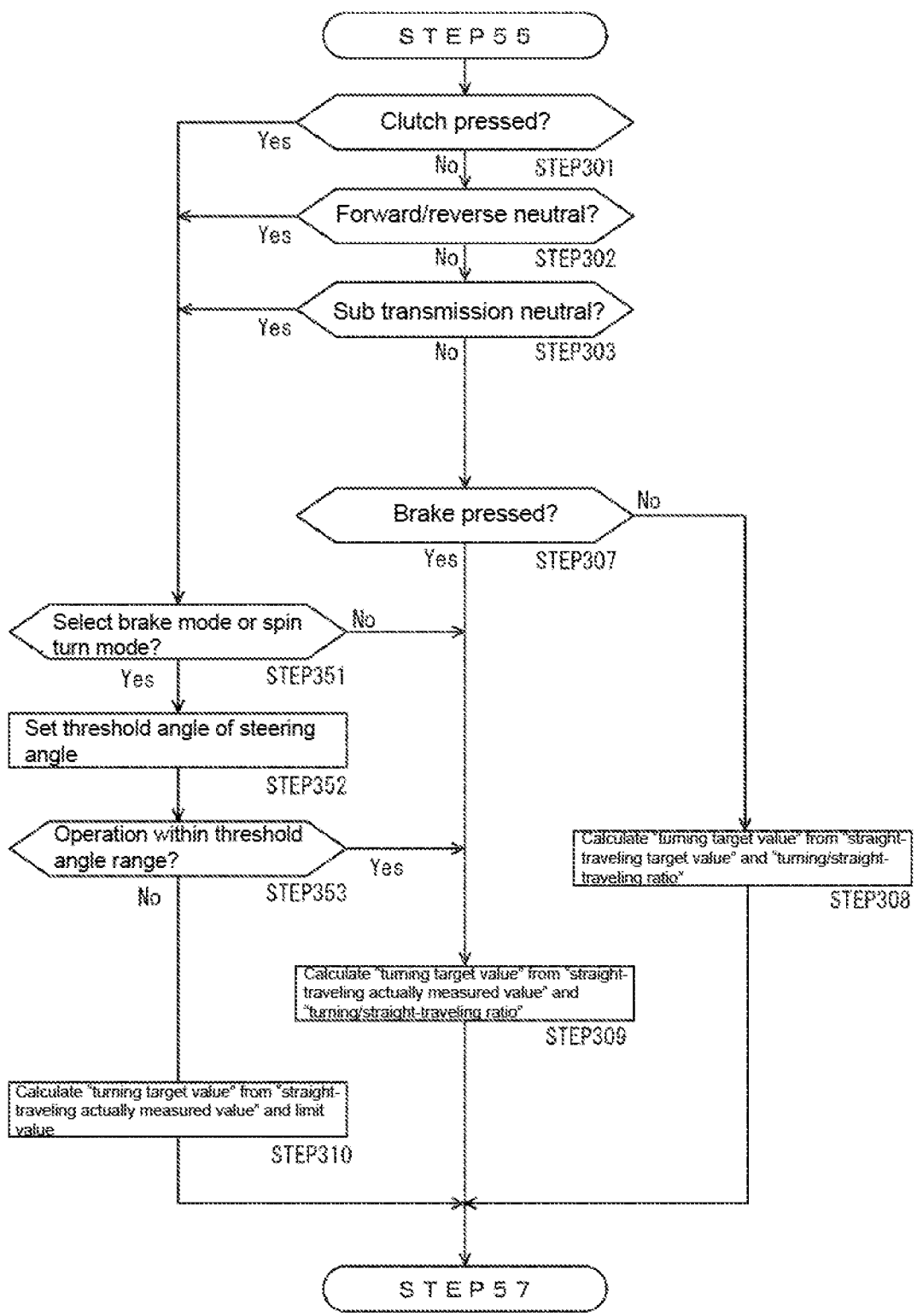

As illustrated in FIG. 24, if driving force transfer from the hydromechanical stepless transmission 500 to the straight-traveling output shaft 30 is blocked (Yes in any one of STEP301 through STEP303), the turning controller 814 determines whether one of the spin turn mode and the brake turn mode is selected or not (STEP351). If one of the spin turn mode and the brake turn mode is selected (Yes in STEP351), the turning controller 814 calculates a steering angle (threshold angle) ±θlim of the steering wheel 9 serving as a limit value ±Ralim of the turning/straight-traveling ratio, in accordance with a turning/straight-traveling ratio table TB and a dead zone range of the selected mode (STEP352). Then, if it is determined that the steering angle θ of the steering 9 is out of the threshold angle range (θ≤−θlim or θlim≤θ) based on a signal from the steering angle sensor 821 (No in STEP353), the turning controller 814 replaces the turning/straight-traveling ratio by a limit value, and calculates a turning target value from a straight-traveling actually measured value (STEP306 and STEP310).

If one of the gentle turn mode and the traveling mode is selected (No in STEP351) or if one of the spin turn mode and the brake turn mode is selected and the steering angle θ of the steering wheel 9 is within the threshold angle range (−θlim<θ<θlim) (Yes in STEP353), a turning target value is calculated from the straight-traveling actually measured value and the turning/straight-traveling ratio (STEP309). In this example, in a manner similar to the second example, after determination on an operation of the brake pedal 35, it may be determined whether an operation is performed on the clutch pedal 37 or not and operation positions of the forward/reverse switching lever 36 and the sub-transmission lever 45 may be determined.

In this example, in a case where a mode of performing a pivot turn is selected, when driving force transfer from the hydromechanical stepless transmission 500 to the straight-traveling output shaft 30 is blocked, the turning/straight-traveling ratio is restricted based on the steering angle of the steering wheel 9. Thus, a pivot turn can be inhibited in accordance with an operation of the steering wheel 9 so that responsiveness in this operation can be enhanced. Since it can be determined whether the turning/straight-traveling ratio is restricted or not without prediction of the traveling crawler 3, the amount of calculation by the turning controller 814 can be reduced. Thus, electrical responsiveness in turning control can be enhanced so that a behavior unexpected by an operator can be prevented in an early stage, and driving safety can be enhanced.

The configurations of components in the present invention are not limited to those of the illustrated embodiment, and can be variously changed without departing from the gist of the invention.

REFERENCE SIGNS LIST 2 traveling body
3 traveling crawler
4 rear wheel
5 diesel engine
8 cockpit seat
9 steering wheel
13 turning transmission case
17 straight-traveling transmission case
500 hydromechanical transmission
501 forward-reverse switching mechanism
502 creep transmission gear mechanism
503 sub-transmission gear mechanism
511 main transmission input shaft
512 main transmission output shaft
521 hydraulic pump unit
522 hydraulic motor unit
523 pump swash plate
524 main transmission hydraulic cylinder
526 planetary gear mechanism
535 traveling relay shaft
537 forward low-speed hydraulic clutch
539 forward high-speed hydraulic clutch
541 reverse hydraulic clutch
624 main transmission hydraulic switching valve
642 forward low-speed clutch hydraulic switching valve
643 forward high-speed clutch hydraulic switching valve
644 reverse clutch hydraulic switching valve
701 hydraulic stepless transmission (HST)
702 differential gear mechanism
703 planetary gear mechanism
704 hydraulic pump unit
705 hydraulic motor unit
706 pump shaft
707 charge pump
708 pump swash plate
709 motor shaft 741 turning hydraulic cylinder
742 turning hydraulic switching valve
813 straight-traveling controller
814 turning controller
821 steering angle sensor
822 main transmission sensor
823 straight-traveling pickup rotation sensor
824 turning pickup rotation sensor
825 forward-reverse movement sensor
826 sub-transmission sensor
827 creep sensor
828 brake sensor
829 clutch sensor
831 straight-traveling computation section
832 memory
833 communication interface
841 turning traveling computation section
842 memory
843 communication interface
880 steering angle (steering wheel steering wheel angle) detection mechanism
881 steering shaft coupling boss
882 steering input shaft (first shaft)
883 steering input gear (first gear)
884 steering output shaft (second shaft)
885 steering output gear (second gear)
886 steering wheel operation restriction cam
887 detent roller
888 detent arm
889 coil spring (biasing means)
890 recess
891 projection
892 housing
893 top panel
894 wall panel
895 bottom panel
896 bolt
897 spacer includes:
916 brake pedal supporting bracket
917 telescopic mechanism
918 tilt mechanism
919 fixing bracket
921 steering shaft
931 movable bracket
TA deceleration table
TB turning/straight-traveling ratio table

The invention claimed is:

1. A work vehicle comprising:
an engine that is mounted on a traveling body;
a straight-traveling system transmission path including a first stepless transmission device; and
a turning system transmission path including a second stepless transmission device,
the work vehicle being configured to combine an output of the straight-traveling system transmission path and an output of the turning system transmission path to drive left and right traveling units and comprising:
a control section configured to control the output of the straight-traveling system transmission path and the output of the turning system transmission path in cooperation with each other; and
a driving force blocking mechanism configured to block a driving force transfer from the straight-traveling system transmission path, wherein
in a case where the driving force transfer from the straight-traveling system transmission path is blocked by the driving force blocking mechanism, the control section restricts the output of the turning system transmission path to inhibit mutually reverse rotation operations of the left and right traveling units.

2. The work vehicle according to claim 1, further comprising:
a transmission operation tool configured to specify the output of the straight-traveling system transmission path; and
a detector configured to detect the output of the straight-traveling system transmission path, wherein
the control section selects one of an instruction value from the transmission operation tool and an actually measured value from the detector and sets the output of the turning system transmission path, and in a case where the driving force transfer from the straight-traveling system transmission path is blocked by the driving force blocking mechanism, the control section sets the output of the turning system transmission path based on the actually measured value from the detector.

3. The work vehicle according to claim 2, wherein
in a case where the driving force transfer from the straight-traveling system transmission path is blocked by the driving force blocking mechanism, when the control section recognizes that a traveling direction of one travel unit of the left and right traveling units is opposite to a traveling direction of the traveling body, the control section restricts a coefficient to multiply the actually measured value from the detector to thereby restrict the output of the turning system transmission path.

4. The work vehicle according to claim 2, further comprising a steering wheel that is rotatable by an operation, wherein
in a case where the driving force transfer from the straight-traveling system transmission path is blocked by the driving force blocking mechanism, when a steering angle of the steering wheel exceeds a predetermined angle, the control section restricts a coefficient to multiply the actually measured value from the detector to thereby restrict the output from the turning system transmission path.

5. The work vehicle according to claim 1, wherein
the control section includes a first control section configured to control the output of the straight-traveling system transmission path and a second control section configured to control the output of the turning system transmission path, and
the second control section receives the output of the straight-traveling system transmission path set in the first control section to thereby set the output of the turning system transmission path.

* * * * *